United States Patent [19]

McCoy et al.

[11] Patent Number: 5,464,058
[45] Date of Patent: Nov. 7, 1995

[54] METHOD OF USING A POLISHED ROD TRANSDUCER

[75] Inventors: James N. McCoy, Wichita Falls; Augusto L. Podio, Austin; James W. Jennings, Hearne, all of Tex.

[73] Assignee: James N. McCoy, Wichita Falls, Tex.

[21] Appl. No.: 405,736

[22] Filed: Mar. 17, 1995

Related U.S. Application Data

[63] Continuation of Ser. No. 8,602, Jan. 25, 1993, abandoned.

[51] Int. Cl.⁶ ..................................................... E21B 47/00
[52] U.S. Cl. ........................ 166/250.01; 166/66; 73/151; 73/781; 73/862.543
[58] Field of Search ...................................... 166/250, 255, 166/65.1, 66; 73/151, 781, 760, 862.381, 862.392, 862.543

[56] References Cited

U.S. PATENT DOCUMENTS

| | | | |
|---|---|---|---|
| 3,343,409 | 9/1967 | Gibbs | 73/151 |
| 3,527,094 | 9/1970 | Yew et al. | 73/151 |
| 3,765,234 | 10/1973 | Sievert | 73/136 R |
| 3,909,713 | 9/1975 | Billeter | 324/636 |
| 4,090,405 | 5/1978 | McKee | 73/151 |
| 4,286,925 | 9/1981 | Standish | 417/12 |
| 4,307,395 | 12/1981 | Standish | 340/870.11 |
| 4,490,094 | 12/1984 | Gibbs | 417/42 |
| 4,507,055 | 3/1985 | Fair et al. | 417/12 |
| 4,527,335 | 7/1985 | Meline | 73/781 R |
| 4,644,785 | 2/1987 | Doyle | 73/151 |
| 4,805,449 | 2/1989 | Das | 73/151 |
| 4,932,253 | 6/1990 | McCoy | 73/151 |
| 4,973,226 | 11/1990 | McKee | 417/18 |

FOREIGN PATENT DOCUMENTS 706716  12/1979  U.S.S.R. ........................ G01L 1/12

*Primary Examiner*—Jeffrey R. Snay
*Attorney, Agent, or Firm*—Richards, Medlock & Andrews

[57] ABSTRACT

In a pumping well, oil is normally lifted to the surface by a rod which extends from the surface to a downhole pump. A transducer is attached to the rod at the surface to sense the deformation, i.e., the change in diameter or circumference of the rod to determine change in rod loading. The transducer includes strain gauges which produce output signals proportional to the change in the diameter or circumference of the rod which occurs due to changes in load on the rod. The transducer may also include an accelerometer. The change in load on the polished rod over a pump cycle is used in conjunction with data produced by the accelerometer to calculate a downhole card. The downhole card showing change in pump load is adjusted to reflect absolute rod load by determining an appropriate offset. Various ways to determine the offset are available. Since the pump plunger load is zero on the downstroke when the traveling valve is open, the value necessary to correct the calculated minimum pump value to a zero load condition may be used as the offset. The offset can also be estimated by either a calculation of the rod weight, a predetermined rod weight measurement or an estimated load value by the operator.

33 Claims, 9 Drawing Sheets

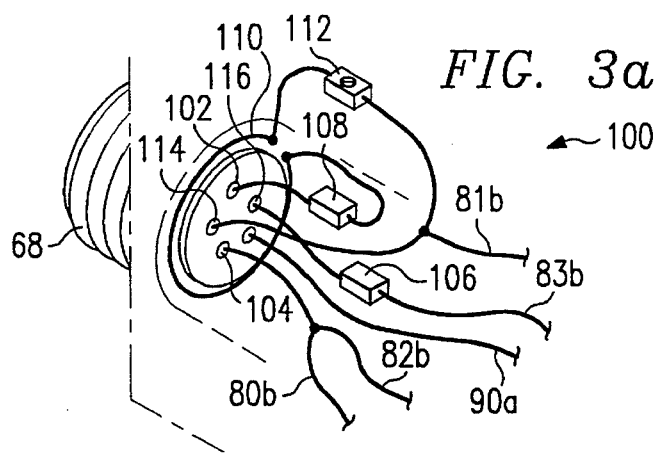
FIG. 3a
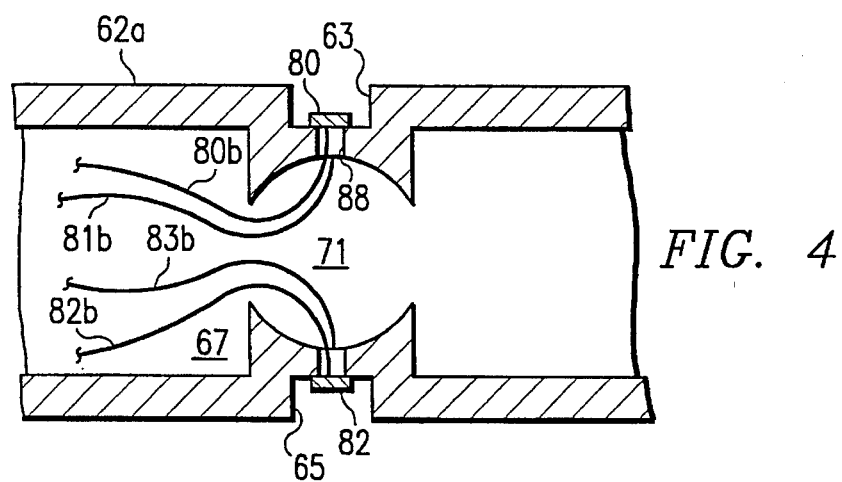
FIG. 4
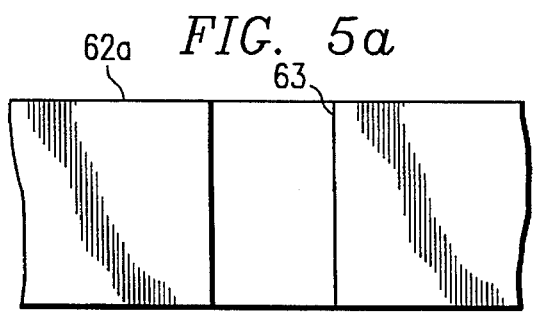
FIG. 5a
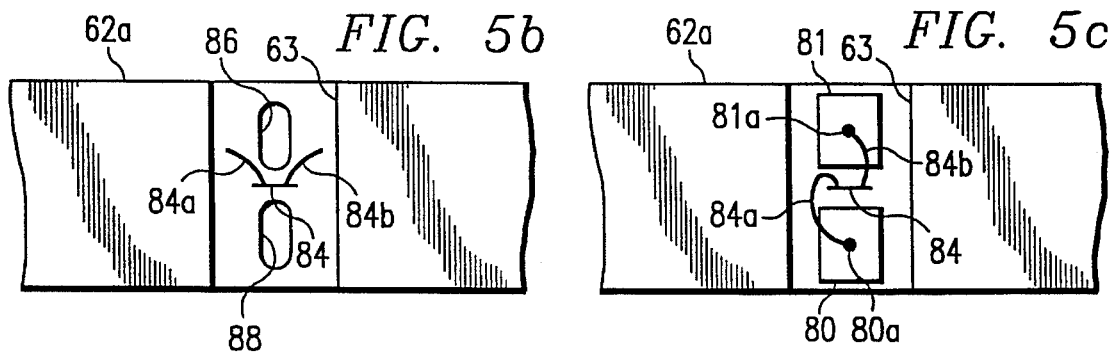
FIG. 5b
FIG. 5c

METHOD OF USING A POLISHED ROD TRANSDUCER

This is a continuation of U.S. Patent application Ser. No. 08/008,602 filed Jan. 25, 1993.

TECHNICAL FIELD OF THE INVENTION

The present invention pertains in general to oil field testing and production equipment and in particular to a transducer for measuring the forces on a polished rod which drives a reciprocating fluid pump.

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The conventional technique for pumping oil from underground reservoirs utilizes a reciprocating downhole pump. At the surface, a motor drives a walking beam which is connected to a polished rod that is in turn connected to a string of sucker rods which extend down the borehole to support the downhole pump. As the motor runs, the walking beam raises and lowers the polished rod and string of sucker rods which causes the pump to lift the fluid from the reservoir up to the surface.

A number of different occurrences can take place the bottom hole location of the pump. The production rate of the well may not be sufficient to fill the pump, gas interference can cause poor pump performance, the pump can become jammed with sand or the pump can become defective. There also could be other downhole problems. Often the conditions at the downhole pump can be determined by measuring the load on the sucker rod at the surface is therefore important in well production to determine the load on the sucker rod to evaluate when the well should be pumped or to notify the operator when there is a problem that requires action. Also, the surface pumping equipment may be overloaded or even severely underloaded.

Several different types of load transducers have been developed. One such load transducer is shown in U.S. Pat. No. 4,932,253 to McCoy. This patent shows a doughnut type load cell. U.S. Pat. No. 3,355,928 to Neeley et al. describes a transducer which is placed into a spacer wherein the transducer has means for extension so that the load can be applied to the transducer without the need for separating the polished rod clamp from the carrier bar. Both McCoy and Neeley describe transducers in which strain gauges are attached to a transducer load member wherein the polished rod load is placed entirely upon the transducer.

Other types of load transducers are disclosed in U.S. Pat. No. 3,965,736 to Welton, U.S. Pat. No. 4,090,405 to McKee, and U.S. Pat. No. 4,644,785 to Doyle. Welton discloses a split cylinder which is used to measure the elongation of the polished rod in order to obtain loadings. McKee discloses a body having at least three symmetrical sections pivotally connected together with a clamping means for clamping the body about a polished rod. The McKee transducer senses the elongation of the rod in order to determine loading. Doyle describes an apparatus for measurement of elongation of the polished rod wherein the apparatus minimizes the transducer output due to bending of the polished rod. Thus, Welton, McKee and Doyle all describe devices which measure the elongation of the polished rod.

A need exists for a polished rod transducer which is lightweight, convenient to use, reasonably rugged, reasonably accurate and can be safely and easily attached to the polished rod in order to analyze the performance of the pumping system. The described polished rod transducer can be attached to commonly used 1 ⅛, 1 ¼ and 1 ½ inch polished rods conveniently and easily. The transducer can be easily attached to the polished rod anywhere below the carrier bar that remains clear of the stuffing box.

SUMMARY OF THE INVENTION

The present invention provides a novel polished rod transducer for detecting changes in load on a polished rod. The polished rod transducer is secured to a polished rod and comprises means for sensing deformation in diameter of the polished rod due to changes in the load on the road. This is unlike prior transducers which measure axial elongation, rather than the change in diameter (deformation) of the polished rod due to changes in load. To detect deformation in the polished rod, the transducer preferably utilizes strain gauges. The strain gauges produce output signal proportional to the change in the diameter of the rod which occurs due to changes in load on the rod.

A further object of the present invention is the use of an accelerometer or other position measuring device. The change in load on the rod over a pump cycle is used in conjunction with data produced by the accelerometer to calculate a downhole pump card. A downhole pump card is a useful tool in detecting downhole problems and analyzing pump performance.

A further object of the present invention is a method for determining absolute values for polished rod load and downhole pump loads. One such method is to adjust the downhole card showing change in pump load by an offset. Various ways to determine the offset value are available. The downhole card can be adjusted by an offset necessary to correct the calculated minimum pump value to a zero load condition. The offset may also be estimated by either a calculation of the rod weight, a predetermined rod weight measurement or an estimated load value by the operator. A buoyant rod weight load can also be calculated. These calculations to determine rod weight are well known in the art.

Still a further object of the present invention is to provide a method for determining absolute polished rod load by adjusting the surface card data (change in polished rod load) by the same offset value used to adjust the downhole card.

The novel polished rod transducer may also include a temperature compensation element to correct for variation in the temperature of the transducer.

Still a further object of the present invention is the utilization of computers and computer software to process and display the data generated by the novel polished rod transducer. Such useful display screens include displays of the raw change in polished rod load data, surface cards (polished rod load versus cycle position), surface cards showing absolute polished rod load, downhole cards showing change in pump load versus cycle position, and downhole cards showing absolute pump loading.

Other and further objects, features and advantages will be apparent from the following description of preferred embodiments of the present invention, given for the purpose of disclosure and taken in conjunction with the accompanying drawings.

BRIEF DESCRIPTION OF THE DRAWINGS

For a more complete description of the present invention and the advantages thereof, reference is now made to the following description taken in conjunction with the accompanying drawings in which:

FIG. 3a is a detailed view of an interior portion of the transducer 60 illustrating the placement of circuit components within the transducer 60, FIG. 4 is a section view of the transducer 60 shown in FIG. 3, FIGS. 5A, 5B and 5C are plan views illustrating the mounting of a strain gauge in a slot of the transducer 60 shown in FIG. 3.

DETAILED DESCRIPTION

Figure 1:
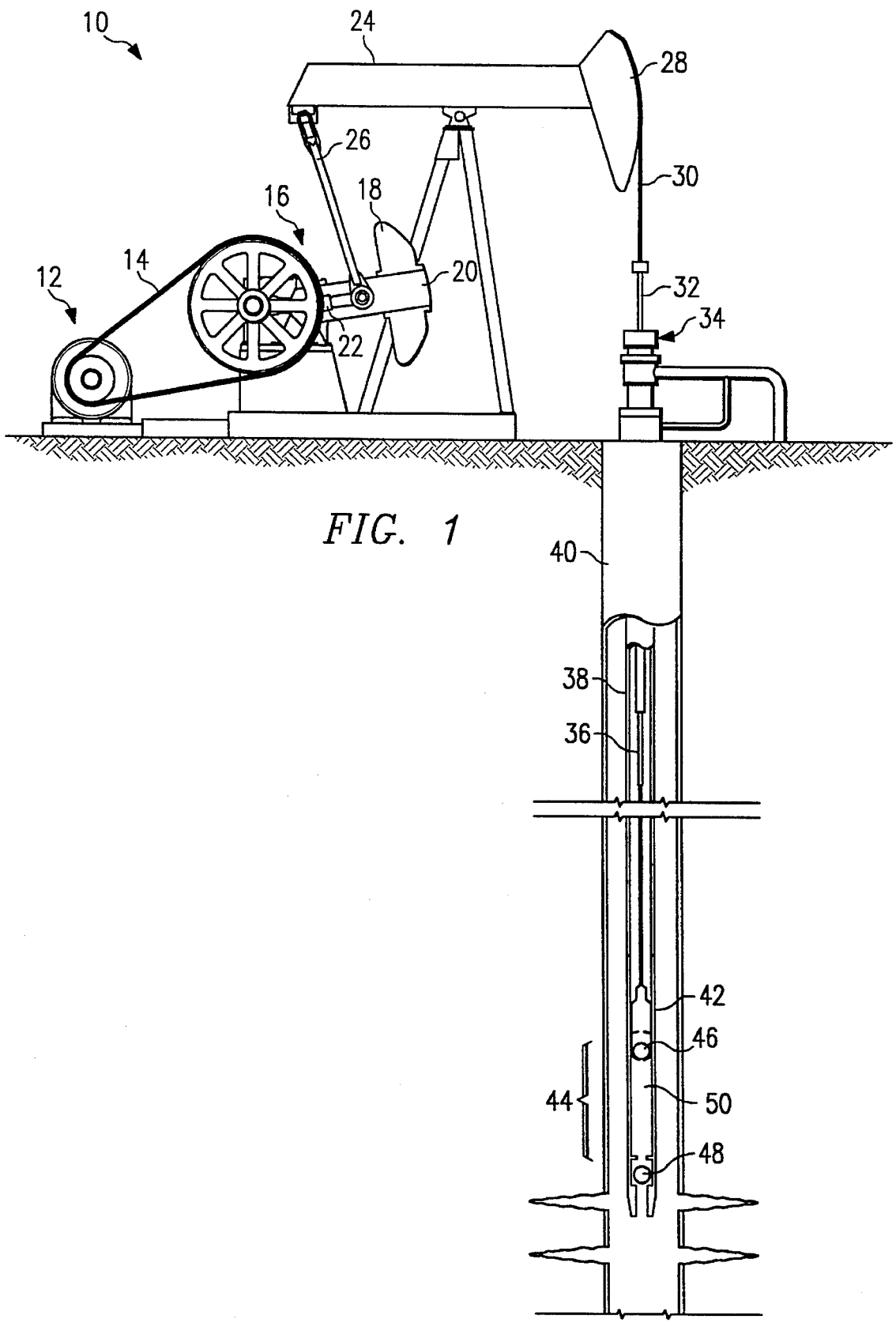
FIG. 1 is a typical oil well rod pumping system.

In most oil wells, the oil is lifted to the surface by a rod which extends from the surface to a downhole pump. A knowledge of the loads in the rod throughout the rod stroke is desirable for design considerations in properly sizing the pumping equipment and for determining the performance of the pumping equipment while the pumping system is in operation. Analysis of load data permits determination of proper pumping unit loading, proper downhole pump traveling valve operation, downhole pump standing valve operation, fluid entry into the pump and other factors which affect the operation of the pumping system. FIG. 1 shows a typical rod pumping system.

Referring to FIG. 1, a rod pumping system, generally indicated by reference numeral 10, includes a prime mover 12, typically an electric motor. The power output from the prime mover 12 is transmitted by a belt 14 to a gear box unit 16. The gear box unit 16 reduces the rotational speed generated by prime mover 12 and imparts a rotary motion to a pumping unit counterbalance, a counterweight 18, and to a crank arm 20 which is journaled to a crank shaft end 22 of gear box unit 16. The rotary motion of crank arm 20 is converted to reciprocating motion by means of a walking beam 24. Crank arm 20 is connected to walking beam 24 by means of a Pitman arm 26. A walking beam horsehead 28 and a cable 30 hang a polished rod 32 which extends through a stuffing box 34.

A rod string 36 of sucker rods hangs from polished rod 32 within a tubing 38 located in a casing 40. The rod string 36 is connected to a plunger 42 of a subsurface pump 44. Pump 44 includes a traveling valve 46, a standing valve 48 and a pump barrel 50. In a reciprocation cycle of the structure, including the walking beam 24, polished rod 32, rod string 36 and pump plunger 42, well fluids are lifted on the upstroke. When pump fillage occurs on the upstroke between the traveling valve 46 and the standing valve 48, the fluid is trapped above the standing valve. A portion of this fluid is displaced above the traveling valve 46 when the traveling valve moves down. Then, this fluid is lifted toward the surface on the upstroke. A schematic description of pump valve operation is made in reference to FIGS. 2A and 2B. Other types of subsurface pumps may be used to lift well fluids through reciprocation. The type of reciprocating pump is not critical to this invention and does not affect its applicability.

Figure 2B:
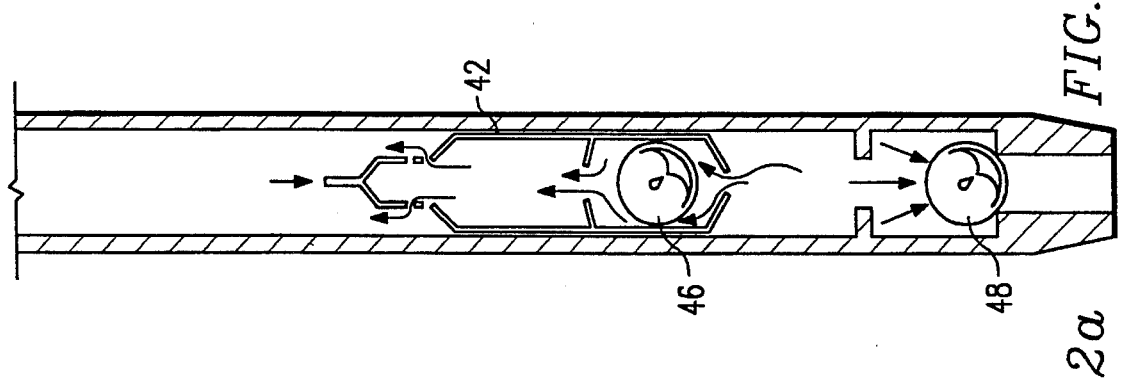
FIGS. 2A and 2B are schematic descriptions of the valve operation for a typical sucker rod pump.
Figure 2A:
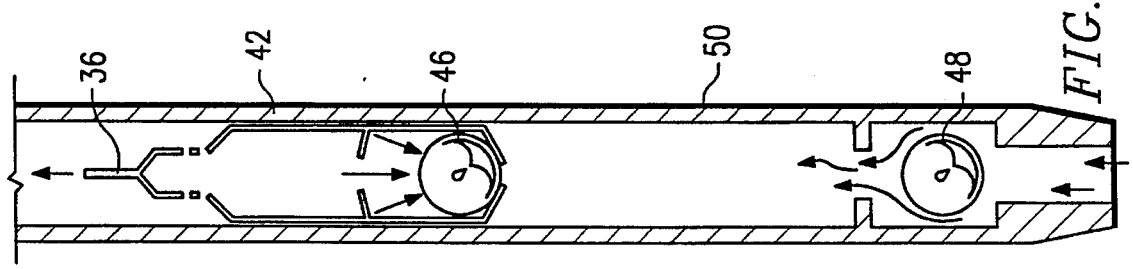

As shown in FIG. 2A, when the rod string 36 is in an upstroke, the traveling valve 46 is closed and the fluid is lifted upward in the tubing 38. During the upstroke, fluid is drawn upward into the pump barrel 50 through the open standing valve 48. Referring to FIG. 2b for a description of the downstroke, as the plunger 42 is lowered, the traveling valve 46 is open thereby permitting fluid within the pump barrel 50 to pass through the valve to allow the plunger 42 to move downward. The fluid within the tubing 38 and the barrel 50 is held fixed in place by the closed standing valve 48. The rod string 36 does not carry any weight of fluid during the downstroke, but does lift the entire column of fluid during the upstroke.

As the load (axial strain) on a polished rod 32 increases, the rod 32 becomes elongated. The elongation of the rod causes a reduction in the cross section (diameter) of the rod due to increases in axial strain. This reduction in cross section is called deformation. The ratio of radial strain to axial strain is termed Poisson's Ratio. Using the proper Poisson's Ratio for a given system, the deformation (change in diameter) of the polished rod can be utilized to determine the change in load in the rod. The polished rod transducer of the present invention, described below, senses the deformation (change in diameter) of the polished rod 32 and generates an electrical output which is proportional to the change in load on the polished rod.

Figure 3:
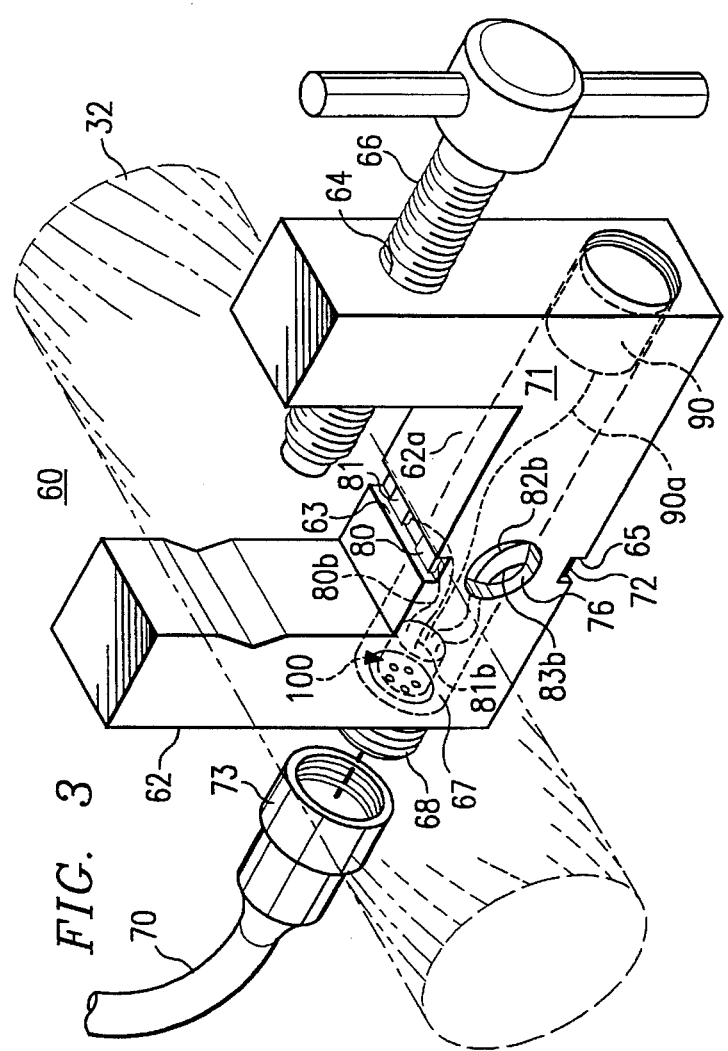
FIG. 3 is a perspective view of a published rod transducer (PRT) in accordance with the present invention.

Referring to FIG. 3, there is shown a preferred polished rod transducer 60 (hereinafter referred to as "PRT" in some instances) in accordance with the present invention. The polished rod transducer 60 includes a C-shaped body 62. The preferred C-shaped geometry of the polished rod transducer 60 minimizes the effect of any bending in the polished rod 32. The C-shaped body 62 has a threaded hole 64 which receives a threaded clamping screw 66. The body 62 together with the screw 66 constitute a clamp for securing the transducer 60 to the rod 32. The force of the clamp acts transversely to the axis of the rod 32. The screw 66 is of sufficient length to allow the transducer 60 to be secured to rods having a range of diameters, the most common being 1 ⅛", 1 ¼" and 1 ½".

An electrical connector 68 is mounted to the C-shaped body 62 and includes a socket for receiving an electrical cable 70. The electrical cable 70 has a mating screw-on connector 73.

Referring also to FIGS. 4 and 5a–5c, the body 62 has a center section 62a which has opposed milled slots 63 and 65. These slots are preferably about 3/16 inch wide, approximately 1/10 inch deep and extend across the body section 62a.

The body section 62a has a hole 76 drilled through the central section thereof between and parallel to the slots 63 and 65 and having a diameter such that the thickness of remaining metal between the bottom of each of the slots 63 and 65 and the interior surface of the hole 76 is approximately 0.020 inch. The body section 62a is further provided with longitudinal cylindrical hole 67 which intersects the hole 76 to form an interior opening 71 within the body section 62a.

In a selected embodiment, the overall length of the transducer 60 is approximately three inches and each transverse end section has a length of approximately two inches. The transducer 60 is preferably made of steel, which is identified as type 15-5 alloy.

When the screw 66 is tightened to secure the transducer 60 to the rod 32, the screw 66 produces a force that is applied to the body section 62a which responds with a deformation.

Referring to FIGS. 3 and 4, terminal pads 80 and 81 are mounted within slot 63 and terminal pads 82 and 83 (not shown) within slot 65.

Referring to FIGS. 5a, 5b and 5c, a sequence of steps are illustrated for mounting a semiconductor strain gauge transducer within the slot 63. A similar procedure is carried out for mounting a corresponding strain gauge within the slot 65. The slot 63 is milled in the body section 62a to have a width of approximately 3/16 inch and extends for the full width of the body section. The body 62a has a width of approximately 1.0 inch.

Referring to FIG. 5b, slotted holes 86 and 88 are formed in the body section 62 within the slot 63. The slotted holes 86 and 88 open to the interior opening 71. These holes weaken the portion of the body section 62a at the base of the slot 63 so that the stress applied to the body section 62a is applied to a lesser amount of metal between the holes 86 and 88 thereby producing a greater strain or deformation in response to a given stress. These are lesser strength portions of the body section 62.

Further referring to FIG. 5b, a semiconductor strain gauge 84 is mounted on the surface of the body section 62a at the base of the slot 63 between the holes 86 and 88. Before the strain gauge 84 is attached to the body section 62a, the metal surfaces of the slots 63 and 65 are grit blasted to prepare the surface. Next, a coating of epoxy is applied to the surface of the slot with a thickness of approximately 0.001 inch. A preferred epoxy is brand M-Bond 610, made by Measurements Group, Inc. After the epoxy has been applied to the surface of the slot, the transducer 60 is cured at a temperature of about 325° Fahrenheit for approximately two hours. This serves to set the epoxy.

In the next step, the semiconductor strain gauge 84, which has gold leads 84a and 84b connected thereto, is held by those leads and touched to a free surface of the same epoxy, noted above, to apply a thin layer of the epoxy to one surface of the strain gauge 84. The gauge 84 is then placed at the bottom of the slot 63 between the openings 86 and 88 and oriented parallel to the main axis of body 62a. The transducer 60, with the strain gauge 84 attached thereto, is then again cured at 325° Fahrenheit for approximately two hours. A post cure at 350° Fahrenheit for two hours may also be used.

The strain gauge 84 is preferably a semiconductor strain gauge manufactured by Micro-Gage of El Monte, Cal. It is identified by part number 919-P-500-04. The gauge 84 has a length of approximately 0.08 inch, a width of approximately 0.008 inch and a thickness of approximately 0.003 inch. It has a typical electrical resistance of 500 ohms. Each of the gold leads 84a and 84b has a diameter of approximately 0.0015 inch. This gauge is not shown to scale in the Figures.

Referring to FIG. 5c, terminal pads 80 and 81 are mounted with adhesive, such as the epoxy noted above, over the respective openings 86 and 88. The terminal pad 81 has a solder pad 81a at the center portion thereof over the opening 86. Likewise, the terminal pad 80 has a solder pad 80a mounted over the opening 88. The lead 84a from the gauge 84 has the free end thereof soldered to the pad 80a of the terminal pad 80. Likewise, the free end of the lead 84b is connected to the pad 81a of the terminal pad 81.

Referring to FIGS. 3, 3a and 4, within the opening 71, there are positioned wires 80b, 81b, 82b and 83b which are respectively connected to the solder pads 80a, 81a, 82a and 83a and at the opposite ends are connected to a circuit 100 (see FIG. 7) and terminals of circuit 100 are connected to terminals in the electrical connector 68 for respective connection to electrical lines within the cable 70.

A strain gauge 87 (shown in FIG. 7) corresponding to gauge 84 is mounted within the slot 65.

After the silicon strain gauge 84 has been mounted in slot 63, the slot is then filled with common wax. Next, a non-permeable foam tape is wrapped about the body section 62a to provide moisture resistance and physical protection. A preferred tape is Scotch (®) brand VHB tape which has adhesives on both sides of the tape and a center foam carrier. Finally, the foam tape is wrapped with a conventional vinyl tape to provide additional physical protection for the strain gauges and connecting wires.

The transducer 60 also includes an optional accelerometer 90 which is housed within body 62 in hole 67 at the end opposite connector 68. Wires 90A are connected to accelerometer 90 and pass through the opening 71 for connection to additional terminals in connector 68. The accelerometer determines the acceleration of the polished rod. The position of the polished rod 32 is determined by twice integrating the acceleration data. A selected accelerometer is a model 3021-002-N manufactured by IC Sensors. An accelerometer is more convenient to use and less expensive than a conventional string position indicator. However, a conventional string position indicators may also be used to obtain positional data for the rod 32.

The preferred polished rod transducer 60 shown in FIG. 3 senses the deformation (change in diameter) of the polished rod 32 due to changes in load on the rod 32. While the preferred configuration of the transducer body is C-shaped, as described, the transducer body may be of any shape and the strain gauges (or other sensing devices) may be located at various positions on the transducer body, so long as the transducer body is shaped and the sensing devices are positioned in a manner which allows the transducer to detect deformation (change of diameter) of the polished rod 32 due to load changes.

Figure 6:
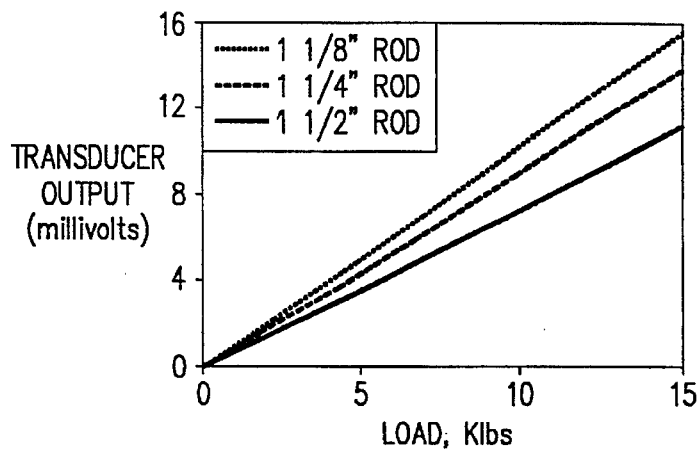
FIG. 6 is a graph of calibration curves for a polished rod transducer for rod sizes of 1 ⅛, 1 ¼ and 1 ½ inches.

To obtain an accurate value for the change in load per unit output the transducer 60 should be calibrated. FIG. 6 shows calibration measurements on a polished rod transducer, such as 60, with rod diameters of 1 ⅛, 1 ¼ and 1 ½ inches. The output plotted is millivolts of transducer output versus load in Klbs (1,000 pounds). Preferably, a gauge excitation voltage of approximately 8 volts is used. These data were obtained by attaching the transducer 60 to a short piece of a polished rod, placing the assembly in a hydraulic press, and measuring the output which results from the compressive load applied. Note that the sensitivity of the transducer is about 1 mv/v/Klb. For the 8 volt excitation voltage applied, a 1 lb change in load on the polished rod will result in a change of approximately 1 micro volt on the output. The curves shown are a plot of actual data points, which is very close to a straight line in each case. In practice, the best fitting line is used to determine the sensitivity of the transducer. Note that the output is linear in all cases, although the slope of each line is different for each size of polished rod, as expected. By calibrating the transducer for various rod sizes, a rod size correction factor can be determined and used in conjunction with the transducer sensitivity. This allows one transducer, such as 60, to be used on various rod sizes and produce accurate measurements.

As described above, the transducer 60 measures the change in rod loading by measuring the change in diameter of the polished rod 32. The generalized form of Hooke's law for homogeneous isotropic materials, which shows the strain in the radial direction resulting from a stress in the axial direction for the polished rod, is set forth below:

$$\epsilon = \mu \sigma / \underline{E}$$

Where:
 $\epsilon$=radial strain
 $\mu$=Poisson's Ratio
 $\sigma$=axial stress
 $\underline{E}$ =Young's Modulus Since the Poisson's ratio for steel is about 0.3, the radial strain is about 30% of the axial strain. So the strain gauges need only be about 3 times more sensitive than strain gauges used with devices which measure axial strain.

Figure 7:
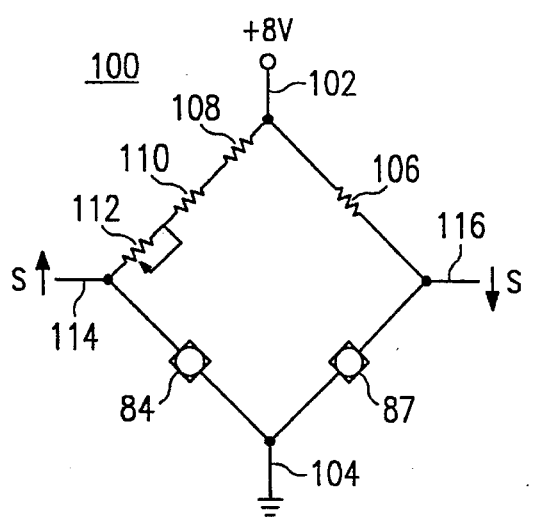
FIG. 7 is an electrical schematic of a circuit used with the strain gauges described herein.

Referring to FIG. 7, there is represented a preferred electrical circuit 100 for use with the strain gauges 84 and 87. The circuit 100, other than the gauges 84 and 87, is physically mounted within the hole 67 in the transducer 60, as shown in FIG. 3a. The strain gauges 84 and 87 are connected in a Wheatstone bridge configuration wherein the resistivity of the strain gauges is a function of the applied tension or compressional forces. The preferred system utilizes approximately 8 volts DC applied between a power terminal 102 and a ground terminal 104. Output signals are measured at terminals 114 and 116. Semiconductor strain gauges 84 and 87 are in the bottom legs of the bridge circuit. As previously described in reference to FIG. 3, the strain gauge 84 is installed on the outer side of the polished rod transducer 62. When the transducer 62 is mounted on the polished rod 32, this gauge is placed in compression. When the load increases on the rod 32, the rod is elongated. The elongation of the rod and the resulting reduction in diameter of the rod 32 causes a closing movement of the C-shaped transducer 60 which results in a tension force on the outer side semiconductor strain gauge 84. The strain gauge 87 is mounted on the inner side of the C-shaped transducer. This gauge will receive a compressional movement when the load on the rod 32 is increased and results in an inward movement on the C-shaped transducer. Thus, the gauges 84 and 87 receive opposite forces due to a changing load on the rod 32.

Further referring to FIG. 7, the resistances of the strain gauges 84 and 87 vary as a function of the force applied to the respective strain gauge. Due to the mounting configuration on the transducer 60, the strain gauges 84 and 87 produce oppositely going electrical changes as a result of a change in the diameter of the polished rod 32. This is indicated by the letter S at the output terminals 114 and 116. When the voltage at one terminal increases, the voltage at the other terminal decreases. The use of two strain gauges in this configuration produces a greater amplitude output signal as a result of the given change in the diameter of the polished rod 32. See FIG. 6.for the output signal amplitude produced by loads on various diameters of polished rods. For example, with an applied voltage of 8 volts on the circuit 100, the transducer circuit 100 produces an output voltage of approximately 8 mv for an applied load of 10,000 pounds on a rod having a diameter of 1 ¼ inches.

The semiconductor strain gauge 87 is in a half bridge in series with a 1,000 ohm resistor 106 between terminals 102 and 104. Terminal 116 is connected at the junction of gauge 87 and resistor 106. The semiconductor strain gauge 84 is in series with three resistors 108, 110 and 112. A fixed 600 ohm resistor 108 is utilized to obtain the proper balance of resistance. A temperature sensitive resistor 110 is utilized to compensate for dimensional changes of the transducer caused by temperature changes. The preferred temperature sensitive resistor 110 is a wire which experiences a change in resistance of approximately 25% for a change in temperature of 100° F. A 250 ohm temperature sensitive Balco wire has been found to be an effective temperature compensation resistor 110. Resistor 110 is secured by epoxy to the interior surface of the transducer 60 as shown in FIG. 3a so that the resistor 110 stays at the same temperature as the transducer 60.

The third resistor 112 is used to control the transducer output as desired. In a preferred application, resistor 112 is a 200 ohm adjustable resistor and the output of the transducer circuitry is initially set for 15 mv/volt at a no load condition. When the transducer 60 is installed on the polished rod 32, the clamping screw 66 is tightened until the output of the transducer is between +1 and −1 mv/volt.

The temperature compensation aspect is a preferred feature of the transducer circuitry. Temperature has an effect upon the dimensions of the transducer. If the transducer and polished rod are at different temperatures when the transducer is installed, the temperature of the transducer will drift towards that of the polished rod. For example, if the transducer is cooling, it will experience a reduction in size. The electrical output which results will be similar to a decrease in polished rod axial load. A change of 1.2 F in transducer temperature can cause a difference in signal as much as is generated by a change in polished rod load of 1,000 lbs. A temperature compensation device is employed in the transducer to substantially reduce the practical effects of this temperature change. This temperature compensation can more easily be accommodated because the transducer output is linear.

Figure 8:
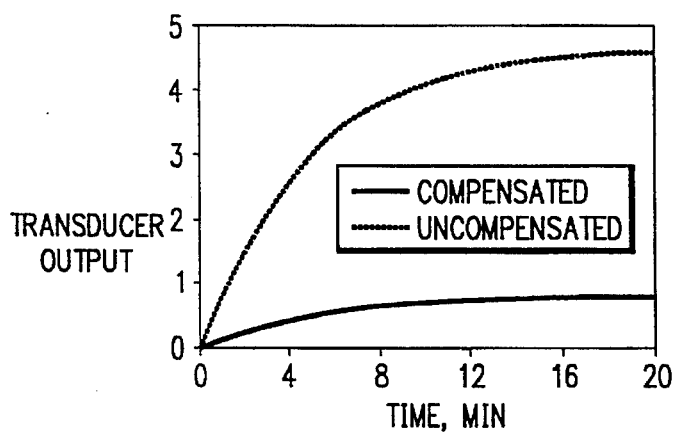
FIG. 8 is a graph representing the effect of temperature on transducer output.

FIG. 8 shows the effect of a change of 40° F. on both a compensated and uncompensated transducer which is clamped to an INVAR rod. It has been found that the effect of temperature is most apparent when determining the changes in load over a period of several reciprocation cycles. FIG. 8 further shows that one should allow about 15 minutes for the system to thermally stabilize for maximum accuracy. The pumping unit may be operated during this stabilization period if desired. Tests have shown that accurate down-hole cards can be obtained without any waiting period however. Preferably, 15-5 alloy is used to make the transducer 60 instead of aluminum for better temperature behavior, even though aluminum is less expensive and easier to machine.

Figure 9:
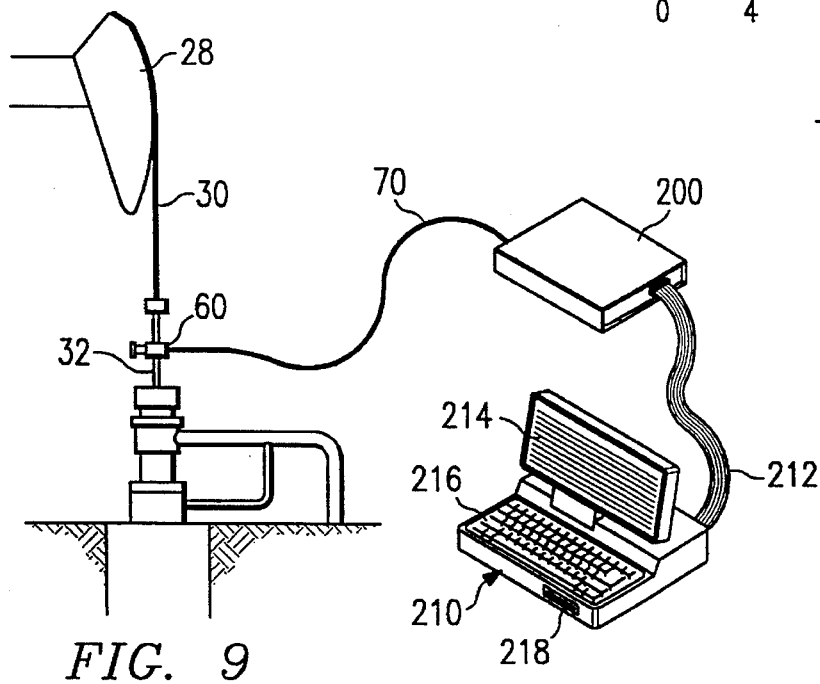
FIG. 9 is a data acquisition and processing system for use with the polished rod transducer of the present invention.

The novel transducer 60 is part of an integrated system which also includes data acquisition and processing components. Referring to FIG. 9, there is illustrated the polished rod transducer 60 of the present invention together with a data acquisition and processing system. The transducer 60 is mounted on the polished rod 32 as described above in reference to FIG. 3. The cable 70 extends from the transducer 60 to an electronics module 200 which is further connected through a cable 212 to a portable computer 210.

The computer 210 is preferably a battery-powered lap top computer which is compatible with the IBM personal computer standard. A representative model of such a lap top computer is a Toshiba Model T2000SX. The computer 210 includes an internal hard disk drive, not shown, a keyboard 216, a display 214 and a floppy disk drive 218. The operational program described below is preferably stored on the hard disk drive of the computer 210.

Figure 10:
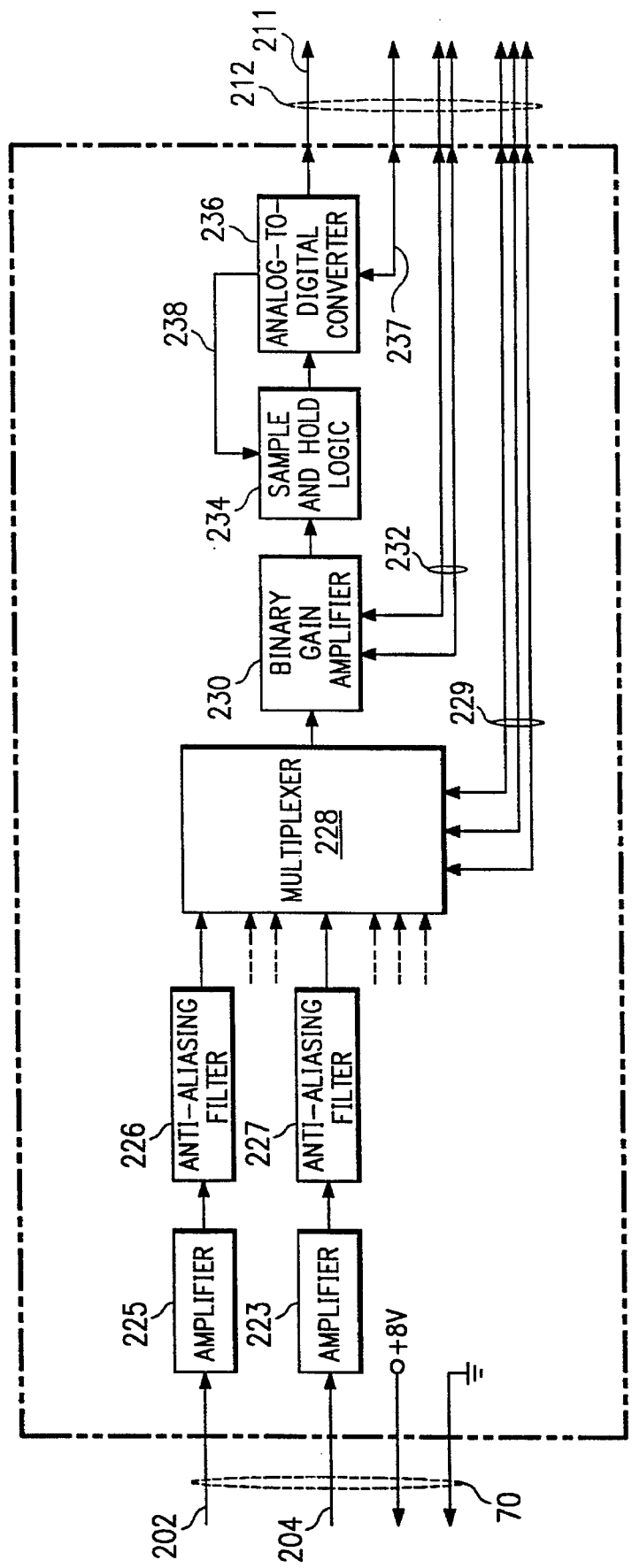
FIG. 10 is a block diagram of the electronics module 200 shown in FIG. 9.

A block diagram of the electronics module 200 is shown in FIG. 10. The cable 70 includes electrical conductors or multiple conductor lines, 202 and 204. The described data acquisition and processing system can be utilized with a plurality of sensors, including the polished rod transducer 60 and accelerometer 90 described herein. Other sensors which may be used include a gas pressure sensor for detecting the gas pressure within the well, a thermometer for measuring gas temperature, a microphone for detecting acoustic reflections and any other sensors which can be used for measuring well parameters.

Further referring to FIG. 10, the lines 202 and 204 are input to the electronic module 200. The lines 202 can be, for example, corresponding to the output terminals 114 and 116 of circuit 100, see FIG. 7. The conductors in line 202 connect to an amplifier 225 and then pass through an anti-aliasing filter 226 to a multiplexer 228. The circuit 100 provides a differential signal through terminals 114 and 116 to the amplifier 225. An amplifier 223 is also provided immediately prior to the filter 226.

Other sensor inputs can be provided through line 204 to an anti-aliasing filter 227 and likewise input to the multiplexer 228. In the present embodiment, the output lines of the accelerometer 90 are provided through line 204.

Power and ground lines, as shown in FIG. 10, are provided from module 200 to the circuit 100 within transducer 60 and to the accelerometer 90, also in transducer 60.

The operation of the multiplexer 228 is controlled by input lines 229 from the computer 210. These lines select the one of the inputs for transmission through the multiplexer 228 for receipt by the computer 210.

The output from the multiplexer 228 is provided to a binary gain amplifier 230 which is controlled by the computer 210 through lines 232.

The output from the binary gain amplifier 230 is provided to a sample and hold logic 234, the output of which is provided to an analog-to-digital converter 236. The operations of the logic 234 and the converter 236 is coordinated through a line 238. The digital output from the converter 236 is provided through a line 211 within the cable 212. Thus, when the multiplexer 228 is connected to receive the output of filter 226, the signal generated by the transducer 60 is passed through the electronics module 200 and received as a digital signal at the computer 210.

The A/D converter 236 acquires data at 20 samples/second, 12 bit, auto-ranging mode for this application. This implies a resolution of about 10 pounds in load. Strain gauge output and accelerometer data are each taken in less than 5 milliseconds, and therefore are assumed to be taken simultaneously. The time between samples being fixed at 1/20 of a second provides the accompanying time information needed for the analysis.

By use of the multiplexer 228, data can be acquired simultaneously from both the transducer 60 and the accelerometer 90. The module 200 can collect at least 1000 samples per second. Only 20 samples per second are needed for the transducer and only about 20 samples per second are needed for the accelerometer 90. Thus, data can be collected from a plurality of sensors simultaneously.

Software has been developed for processing the digitized change in load data and acceleration (position) data to obtain downhole cards and surface cards. A card is a plot of load versus position. Such software also provides various display screens which make the operation and use of the transducer relatively simple. Provided as an Appendix hereto is the program code for the software which generates the various display screens and an explanation of the use thereof.

With respect to the acceleration data, this data is used to determine the position of the rod as a function of time. There are technical considerations such as a sampling rate, filter frequency, and determination of the constants of integration. The sampling rate used in this system is 20 samples/second. The resulting data is filtered with a digital filter at about 8 hz, the theoretical maximum being 10 hz for the sample rate of 20 hz. The filtered data is then integrated once, which yields the velocity function. This integration is a straightforward digital integration. The constant of integration for this step is determined so as to force the average velocity over an integral number of cycles to be zero.

Next, a second integration is performed, resulting in polished rod position as a function of time. The constant of integration for this step is determined by requiring that the polished rod position minimum value is the same for each cycle. That is, the bottom of the stroke on each cycle is the same value, arbitrarily set to zero in this case. During this process, the pumping rate (strokes/second) is calculated. Thus the polished rod position throughout the stroke is obtained from twice integration of acceleration data and use of an acceleration sensitivity constant. The calculated polished rod position is fitted to the stroke length of the particular pumping system. If the calculated and measured polished rod strokes vary by more than 10%, the software alerts the operator to check the measured polished rod stroke, and if the measured polished rod stroke length is correct, the software prompts the operator to accept a computer calculated accelerometer coefficient which will result in recalibration of the accelerometer. The bottom of each stroke is then shown by a vertical line on all succeeding plots of time varying data. The integration process does not require any operator intervention, other than a single keystroke on the computer.

The program code further processes the change in load data in conjunction with the positional data to generate a downhole card. Mathematical relationships have been developed to calculate the load in a moving rod at distances from a reference point. See Gibbs, S.G., "Predicting the Behavior of Sucker Rod Pumping Systems", *Journal of Petroleum Technology*, July 1963. The surface change in load data generated by the transducer is used in conjunction with surface acceleration, velocity and/or position data to calculate loadings on a downhole pump which is several thousand feet below the surface. The movement and dynamic effects of the rod as well as damping factors are considered in the calculation of the downhole pump card which is a graph of load versus position. The mathematical relationships permit the operator to calculate the downhole pump loading from the surface load and position measurements so that a pump load diagram of the pump performance throughout the pump stroke can be obtained. This permits an analysis by the operator of the traveling valve closing, traveling valve load, standing valve operation and pump plunger operation and performance.

Figure 11:
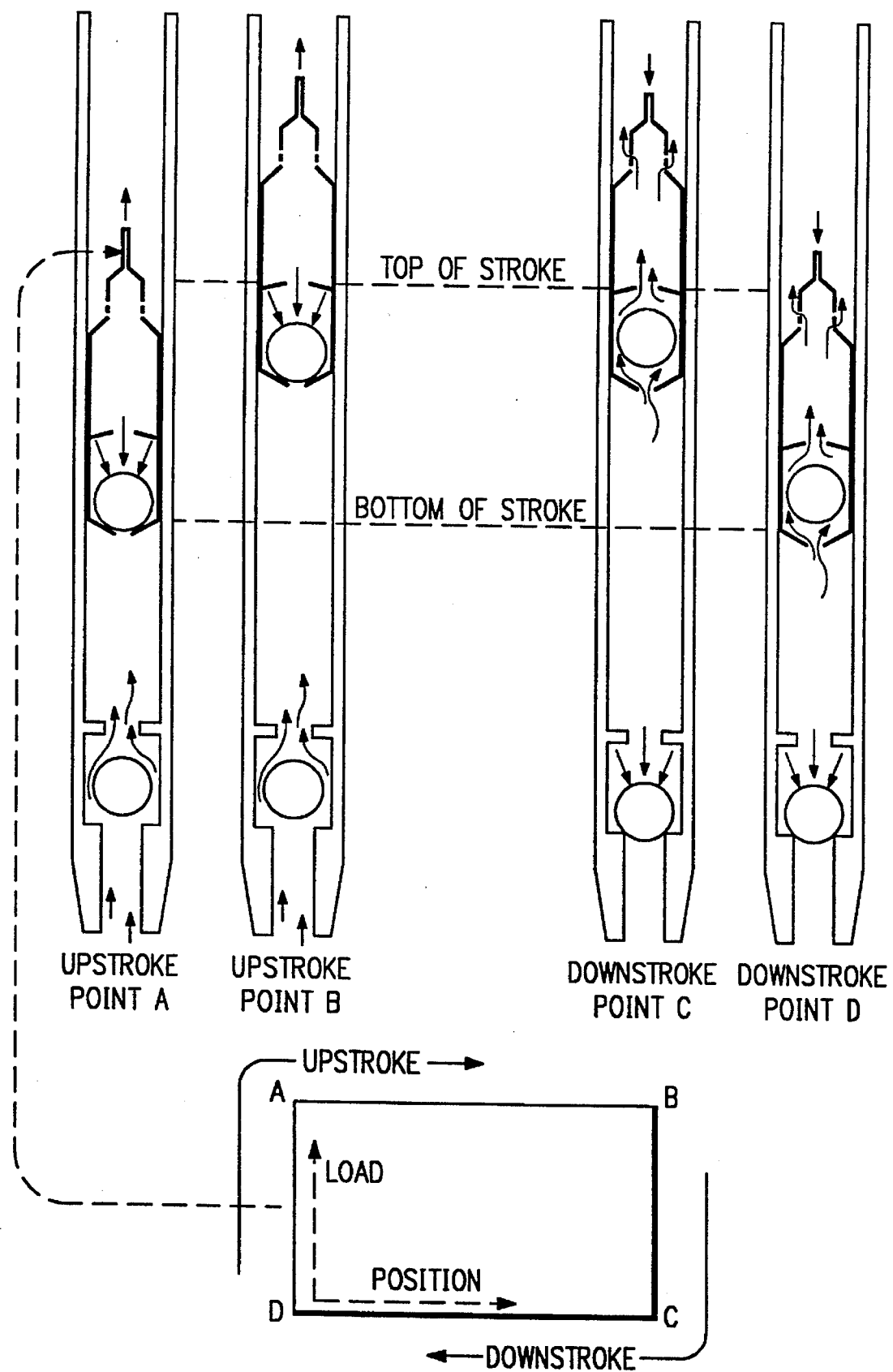
FIG. 11 is a schematic illustration showing the operation of a typical rod pump and the relative changes in plunger load versus the position of the pump.

Reference is made to FIG. 11 which shows the general shape of a downhole card with the corresponding pump valve positions during a stroke cycle. On the upstroke, the traveling valve closes which results in a load being placed on the plunger. On the downstroke, the traveling valve opens when the plunger enters the liquid. The plunger loading at this time is approximately zero since the traveling valve is open. By determining the pump card shape, the amount of pump fillage can be determined by locating the drop in loading during the downstroke. See FIG. 15 as an example of complete pump fillage and FIG. 26 for partial pump fillage. Therefore, the shape of the pump card is important with or without actual load and position values.

Figure 12:
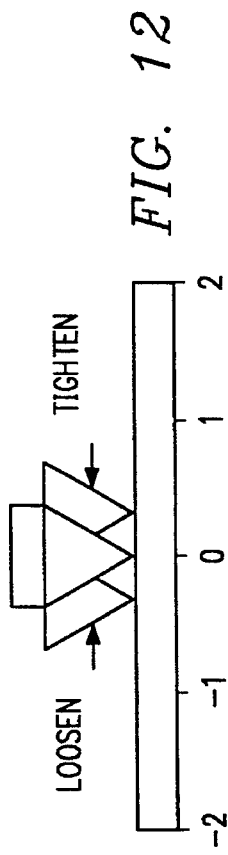
FIG. 12 is a display screen generated by a computer program described herein which assists in the proper clamping of the polished rod transducer on a polished rod.

When the transducer is first placed on the polished rod, the operator must be careful not to over stress the device. A simple display, similar to that shown in FIG. 12, is shown on the data acquisition computer screen 214 to assist the operator in properly attaching the transducer. The clamping screw 66 on the transducer 60 is adjusted until the triangle is approximately centered on the ruler. This assures that the transducer is operating near the midpoint of its range. The preferred transducer 60 described above has a no load output of approximately 15 mV/V depending upon the temperature. The clamping screw 66 should be properly tightened to hold the transducer 60 to the polished rod 32. This is indicated by a zero voltage output.

Figure 13:
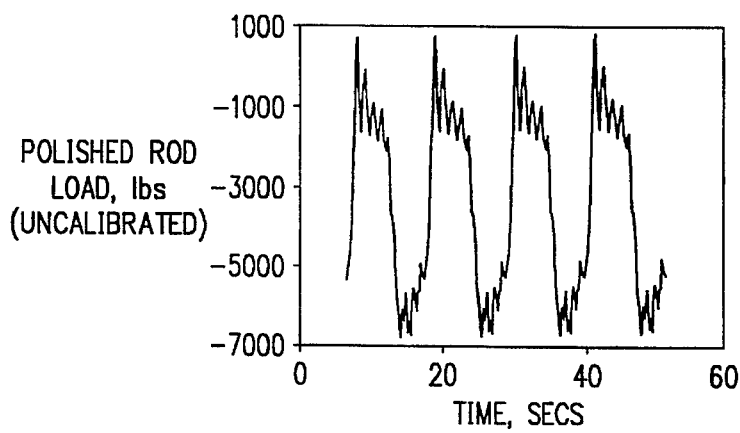
FIG. 13 is a display screen generated by the computer program described herein which shows uncalibrated load data generated by the polished rod transducer as a function of time.

Once the transducer 60 is properly attached to the polished rod 32 and the equipment connected and checked, the acquisition of data may begin. In a display mode of operation, the screen 214 of the computer 210 works much like an oscilloscope in that the data is plotted as a function of time. FIG. 13 shows an example of load data as it is being obtained in real time. This Figure shows four pumping cycles. An operator can verify that the proper data is being obtained by observing the associated plots on the screen. Plots of change in load or acceleration may be obtained in real time. All pertinent identification information as well as the current time of day is shown on the screen. In addition, the scale of the data is displayed. The operator indicates his desire to capture data by pressing a key on the computer. One minute of contiguous data is collected. Even though only change in load information is being displayed on the screen, acceleration data may be displayed if desired. After one minute of data is obtained, the operator may proceed to dynamometer analysis, or optionally repeat the data acquisition process. One minute of data will normally result in five or more complete pumping cycles.

The operator initiates the calculation of the polished rod position as a function of time by pressing a designated key on the computer keyboard.

It should be remembered that the raw polished rod transducer load data indicates the change in rod load and is not an absolute measurement of the load in the rod. For example, when the polished rod transducer 60 is placed on the rod 32, the polished rod may already have a load of 15,000 pounds. But, if the transducer 60 was adjusted to approximately zero output, the load is generally indicated as both positive and negative values, as in FIG. 13. Therefore, to obtain absolute or true load values, when a downhole pump card is calculated, the load values must be adjusted by an offset.

In a preferred method of determining the appropriate offset, the downhole pump card is offset to bring the bottom of the pump card to zero. While the bottom of the pump card when the traveling valve opens is not exactly zero load, a value of zero can be utilized with generally a minimum of error. Buoyant forces on the bottom rod (immediately above the pump) are neglected. The program calculates the mechanical loading on the rod immediately above the pump plunger. Offsetting the downhole pump card so that the bottom of the pump card is at zero load allows the operator to better utilize the downhole card to determine the performance of the pumping system. The maximum pump load shown can be utilized in the analysis of the pumping system. Whatever offset is needed to reposition the downhole pump card to a minimum load value of zero is also utilized to shift the surface data card by an equal amount. An optional approach is to use the buoyant force on the rod, rather than zero. This can be calculated based on the physical configuration of the rod.

The polished rod transducer 60 permits an operator to obtain changes in load values in rod 32, to obtain acceleration data if an accelerometer is included, to calculate a downhole pump card, to offset the downhole pump card to a predetermined minimum load condition (of zero) and then to shift the surface data card by the same offset to values which approximate the actual loadings in the polished rod 32. The minimum pump load could be set to zero. Or, the minimum pump load could be set to the hydrostatic compressive load in the rod holding the traveling valve or to some other predetermined condition.

Figure 18:
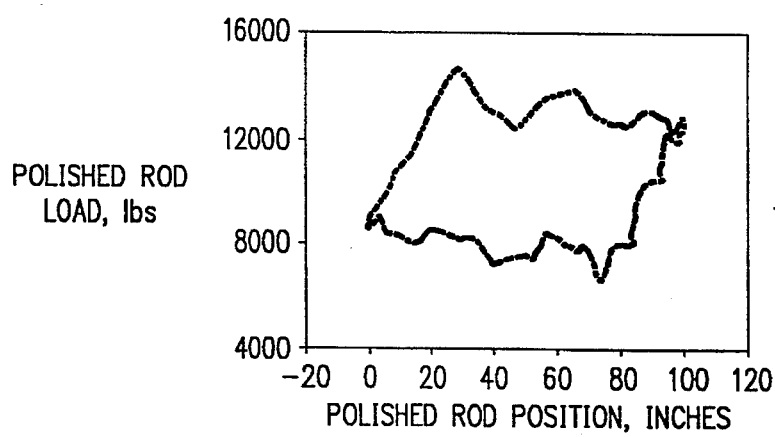
FIG. 18 is a display screen generated by the computer program described herein which is a plot of polished rod load versus polished rod position over several pump cycles for an adjusted surface load value produced in accordance with the present invention.

The computer program disclosed herein allows the operator to automatically determine the offset as described above by calculating the down-hole card and then determining the offset that causes the minimum value of the pump card on the down stroke to be zero. First, the polished rod 32 is stopped at the bottom of the stroke. The transducer 60 is installed on the polished rod 32 using the screw 66 to zero the transducer output which is displayed on the computer screen 214. The pumping unit is started and data acquisition begins. The operator views the displayed data to determine if excessive drift is occurring, which is manifested by varying maximum loads on the upstroke of successive cycles. When the drift is acceptable, which normally occurs immediately, the data is accepted by the operator for processing. The position of the polished rod is calculated first. Then, the operator selects a stroke for analysis. The computer analyzes the surface load data which generally has positive and negative loads along with acceleration data (or velocity or position) with well file rod data to obtain a downhole pump card. This is done by use of the technique described in the Gibbs article, noted above. The downhole pump card will generally have large compressive forces. The bottom of the pump card is set to zero by utilizing an appropriate positive offset. This assumes that the minimum load on the traveling valve on the down stroke is zero, which is a practical value assuming minimal frictional forces. The surface card which contains both positive and negative load values is adjusted by the same positive offset that was utilized to shift the bottom of the pump card to zero. The program guides and prompts the operator during this simple data acquisition and analysis phase. An overlay plot of the several surface offset dynamometer cards, that is, change in the polished rod load vs. polished rod position, may be made as shown in FIG. 18. Notice that the cards lay over one another, indicating little or no drift. In addition, the operator may also select the display of detailed information on any single stroke.

The offset can also be obtained using manual entry of the buoyant rod weight by the operator. For the manual mode of operation, the polished rod 32 is stopped at the bottom of the stroke and the transducer is installed. The pumping unit is operated for one minute to allow seating of the transducer to the polished rod. Again, the polished rod 32 is stopped near the bottom of the stroke while the traveling valve is open. The computer presents the operator with a drift screen which continuously monitors transducer 60 output while the rod 32 is stationary. When the drift is within acceptable limits, the operator continues with load selection. With the polished rod 32 stopped near the bottom of the stroke and the traveling valve open, the buoyant rod weight exists on the polished rod. The operator has three choices of manual load (offset) selection. First, the operator can use known equations to calculate buoyant rod weight from data typically maintained in a well file for the particular pumping system. Second, if the operator desires more accurate data, the operator has the option of premeasuring the buoyant rod weight using known horseshoe transducers or load cells such as those disclosed in U.S. Pat. No. 4,932,253 to McCoy and U.S. Pat. No. 3,355,928 to Neeley. U.S. Pat. No. 3,965,736 to Welton; U.S. Pat. No. 4,090,405 to McKee; and U.S. Pat. No. 4,633,785 to Doyle disclose approximation systems. The program allows the operator to utilize this premeasured buoyant rod weight if desired. Lastly, in certain circumstances, the operator may enter a zero or an assumed rod load when performing certain tests known in the field, such as measuring loads in an anchor line.

Figure 14:
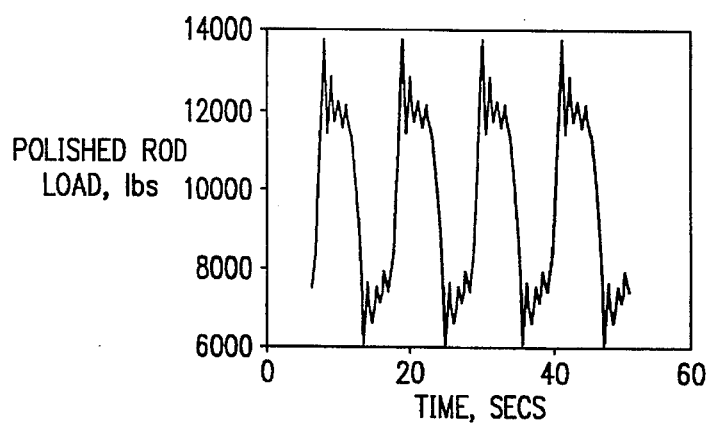
FIG. 14 is a plot of calibrated load data versus time for a quantitative type absolute value load transducer.

FIG. 13 shows the load data for 4 complete pumping cycles taken from a typical well using the transducer 60. FIG. 14 shows similar data from the same well taken with a horseshoe type of transducer. Notice that the data for the two transducers have the same shape and amplitude, the data for the transducer 60 is simply shifted down by a constant. An automatic calibration procedure determines the offset necessary to make the transducer 60 data approximately equivalent to the horseshoe sensor data. If during the examination of the load data, the operator sees that a change from cycle to cycle is occurring (drift) additional data should be taken until the drift is at a minimum. Actually, it is only necessary that the drift over one pumping cycle be minimal in order to obtain good results.

Figure 15:
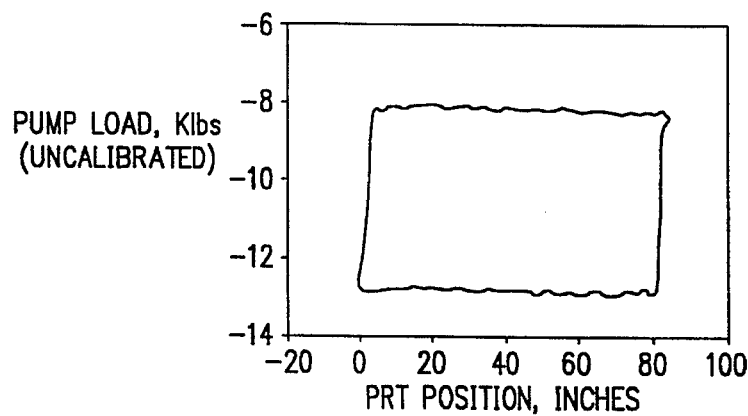
FIG. 15 is a display screen generated by the computer program described herein which is a plot of calculated pump load versus calculated pump position using the polished rod transducer without an adjustment by an offset.
Figure 16:
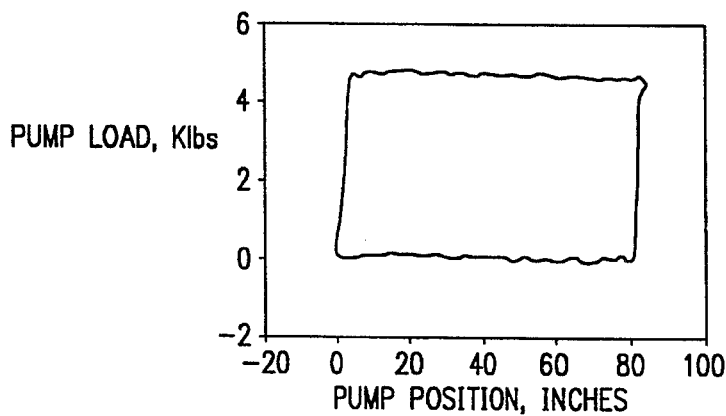
FIG. 16 is a display screen generated by the computer program described herein which is a plot of a calculated pump load versus calculated pump position using the transducer of the present invention with an offset to position the minimum pump load at zero load.
Figure 17:
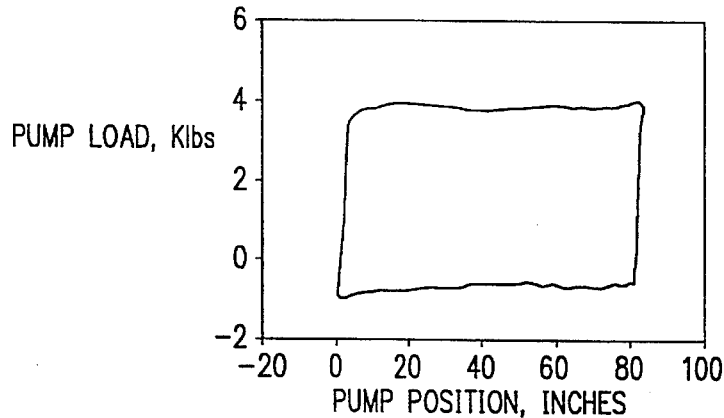
FIG. 17 is a plot of pump load versus pump position using a quantitative type absolute value transducer.

An actual downhole card generated by the novel transducer without adjustment by an offset is shown in FIG. 15. Note the large compressive forces. FIG. 16 shows this downhole card adjusted by an appropriate positive offset so that the minimum load is zero. A downhole card generated by a quantitative absolute value transducer is shown in FIG. 17. This is done without use of an offset value. Notice that the card shape, which is the primary diagnostic tool, is the same in all instances. Also, the load values for the transducer 60, adjusted by an offset, and quantitative absolute value transducer are very similar.

FIG. 18 is an overlay of the transducer 60 surface load data plotted against position with the loads adjusted by the same offset used on the pump card.

Figure 19:
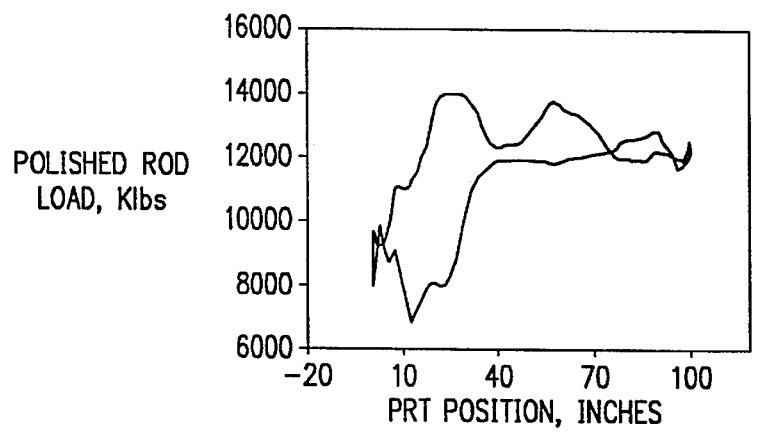
FIG. 19 is a plot of polished rod load vs. polished rod position surface data for a well which has partial pump fillage and a total surface stroke of 100 inches.

FIG. 19 shows a surface dynamometer card obtained from transducer 60 data. The transducer 60 acquired surface data was used to calculate the downhole card shown in FIG. 20. The minimum load value was set to zero. The same offset used on the downhole card was used on the surface data to display a surface card. Note that an operator can visually analyze that the downhole pump is less than one-half full of liquid.

Although the transducer 60 of the present invention has been described in reference to the oil field environment, it may equally be employed in any application requiring the detection or measurement of compressive or tension forces.

Figure 21:
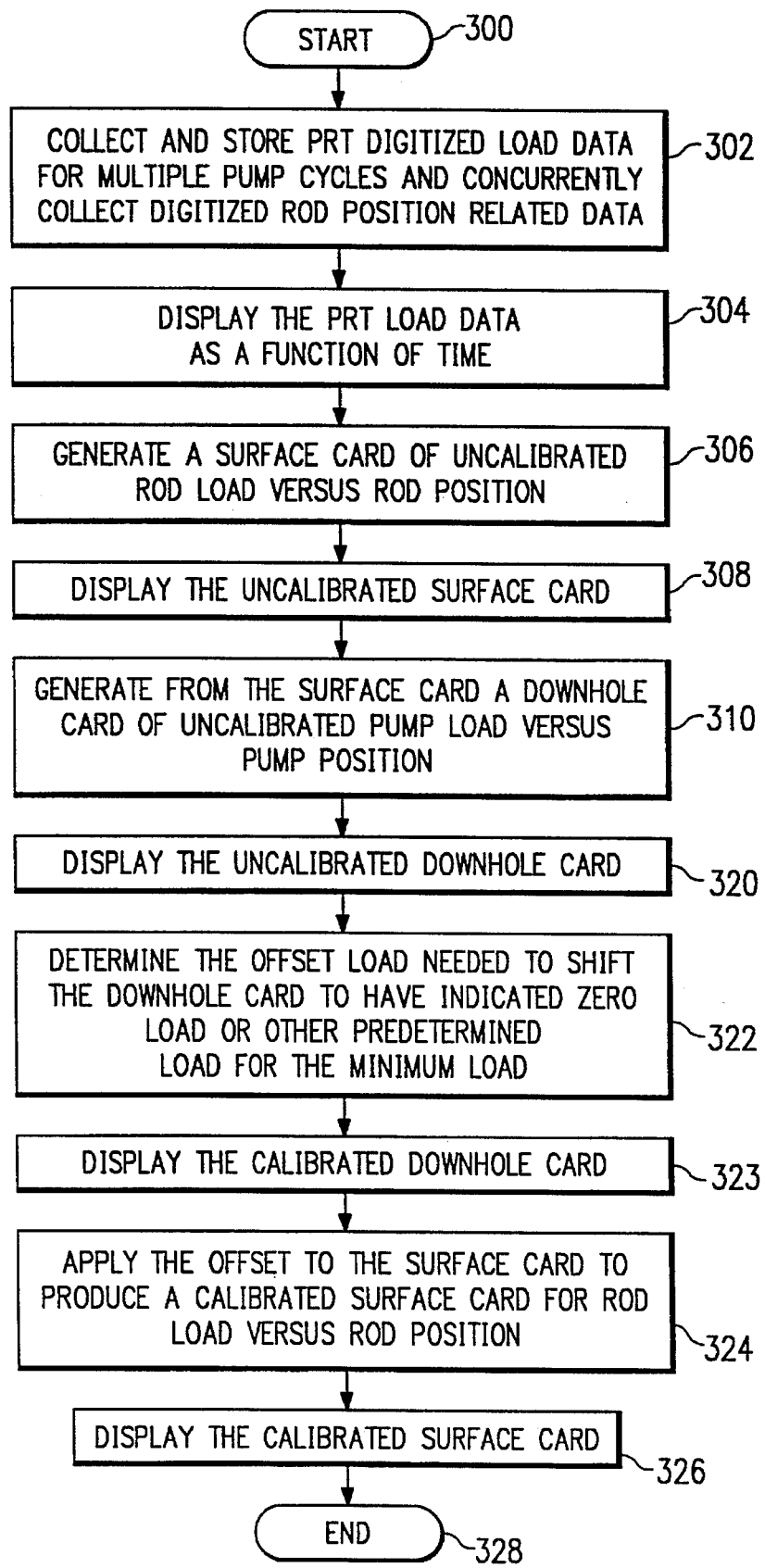
FIG. 21 is a flow diagram illustrating an operational process for the present invention.

Referring now to FIG. 21, there is shown a flow diagram representing operation of software for implementation of the operations of the present invention. Beginning with a start block 300, operation commences with an operation block 302 in which the transducer 60 data and accelerometer 90 data are collected simultaneously for multiple pump strokes. Next, in block 304 the transducer 60 load data is displayed as a function of time on the computer display screen 214 as either uncalibrated data (FIG. 13) or calibrated data (FIG. 14). This data is calibrated by either the procedure described below or by an operator input of a known value.

Following display operation block 304, operation is transferred to block 306 to generate a surface card of uncalibrated rod load versus rod position (see FIG. 15). Next, in block 308 the uncalibrated surface card is displayed on the computer screen.

After display in block 308 operation is transferred to block 310 to generate from the surface card a downhole card which shows uncalibrated pump load versus pump position (see FIG. 17). This is determined as set forth in the article by Gibbs noted above. This uncalibrated downhole card is then displayed on the computer screen as set forth in block 320.

Figure 20:
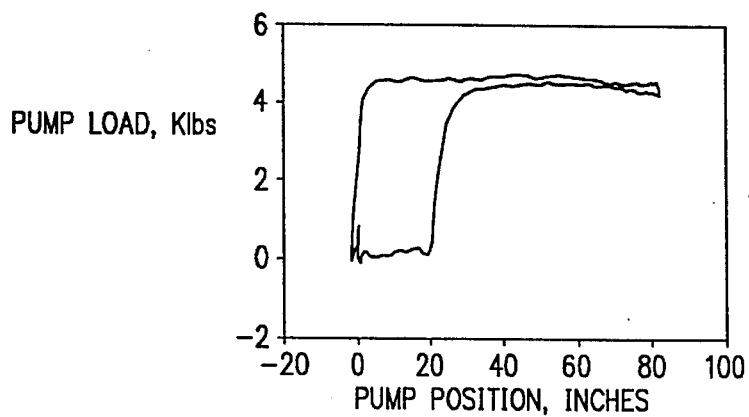
FIG. 20 is a plot of pump load vs. pump position (obtained from surface data displayed in FIG. 19) which shows approximately 23 inches of pump fillage in a pump with 82 inches of traveling valve displacement.

Next, in block 322, the downhole card is shifted by an offset load so that the minimum load is at an indicated zero load or other predetermined load on the card (see FIG. 20). The offset load amount is recorded for future use.

In step 323 the calibrated downhole card is shown on the computer display screen.

In the next block 324, the recorded offset load is applied to the surface card to produce a calibrated surface card for rod load versus rod position (see FIG. 19).

Enclosed herewith as Appendix A is a software listing for implementing a preferred embodiment of the present invention. This is a source code listing which can be readily understood by workers in this field.

In summary, the present invention provides methods and apparatus for analyzing and developing performance information relative to numerous components of a rod pumping system.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

APPENDIX A

```
DECLARE SUB VUnHighLight (Cord%(), Choices$(), iCurrent%)
DECLARE SUB DrawVToggelText (Cord%(), Choices$(), iMax%)
DECLARE SUB VHighLight (Cord%(), Choices$(), iCurrent%)
DECLARE SUB DrawToggelText (Cord%(), Choices$(), iMax%)
DECLARE SUB HighLight (Cord%(), Choices$(), iCurrent%)
DECLARE SUB ToggelList (Cord%(), Choices$(), iMaxChoice%,
iPick%)
DECLARE SUB UnHighLight (Cord%(), Choices$(), iCurrent%)
DECLARE SUB PlaceYlabel (ymin!, ymax!)
DECLARE SUB PlaceXlabel (TimeMax!)
DECLARE SUB CALWB (WB!(), DEPTH!, T$(), DPARAMS!())
DECLARE SUB BaseUnit (x!, y!, l!, h1!)
DECLARE SUB Connector (x!, y!, l!, h!)
DECLARE SUB DrawAxis (x!, y!, iNumberMajDev!,
iAxisLength!)
DECLARE SUB Handle (x!, y!, xc!, yc!, r!, l!, h!)
DECLARE SUB Label ()
DECLARE SUB LabelAxis ()
DECLARE SUB MajorTicMark (x!, y!, iTicLength!, iTicWidth!)
DECLARE SUB MinorTicMark (StartX!, StartY!, iLength!,
iWidth!)
DECLARE SUB Pointer (iHeight!, iWidth!, PtrArray%())
DECLARE SUB PolishedRod (x!, y!, l!, h!)
DECLARE SUB SetPtr (x!, y!, iWidth!, iHeight!,
PtrArray%())

'
' draw base unit of polished ro xducer
'
SUB BaseUnit (x, y, l, h1)
  h2 = h1 * .65
  w1 = l * .25
  PSET (x, y), 1           'a
```

```
    LINE -(x + l, y)           'b
    LINE -(x + l, y + h1)      'c
    LINE -(x + (l - w1), y + h1)    'd
    LINE -(x + (l - w1), y + (h1 - h2))   'e
    LINE -(x + w1, y + (h1 - h2))    'f
    LINE -(x + w1, y + h1)     'g
    LINE -(x, y + h1)          'h
    LINE -(x, y)               'i
END SUB

SUB Connector (x, y, l, h)
 h2 = h * .25
 w1 = l * .1
  PSET (x, y), 1              'a
  LINE -(x - w1, y)           'b
  LINE -(x - w1, y + h2)'c
  LINE -(x, y + h2)   'd

END SUB

SUB DrawAxis (x, y, iNumberMajDev, iAxisLength)
 iMajTicWidth = 5              'width of major tic mark
 iMajTicLength = 15            'vertical length of major tic
mark
 iMinTicWidth = iMajTicWidth   'width of minor tic mark
 iMinTicLength = 6             'vertical length of minor tic
mark iAxisWidth = iMajTicWidth
 iMidTic = iMajTicWidth \ 2    'offset needed to center tic
mark
 LINE (x, y)-(x + iAxisLength, y + iAxisWidth), , BF
 iMajTicLength = iMajTicLength + iAxisWidth
 iMinTicLength = iMinTicLength + iAxisWidth
```

```
FOR i = 0 TO iNumberMajDev - 1
   iMajTicOffset = i * (iAxisLength / iNumberMajDev)
   iMinTicOffset = iMajTicOffset + (iAxisLength /
iNumberMajDev) \ 2
   CALL MajorTicMark(x + iMajTicOffset - iMidTic, y,
iMajTicLength, iMajTicWidth)
   CALL MinorTicMark(x + iMinTicOffset - iMidTic, y,
iMinTicLength, iMinTicWidth)
NEXT i
iMajTicOffset = i * (iAxisLength / iNumberMajDev)
CALL MajorTicMark(x + iMajTicOffset - iMidTic, y,
iMajTicLength, iMajTicWidth)
iX = x + ((iAxisLength \ 2) - (iAxisLength /
iNumberMajDev) \ 2)
iY = y - 40
cX = (iAxisLength / iNumberMajDev)
cY = iMinTicLength
LINE (iX, iY)-(iX + cX, iY - cY), , BF
END SUB '
' draw the handle of polished rod xducer
'
SUB Handle (x, y, xc, yc, r, l, h)
 h2 = h * .65
 w = l * .45
 w1 = l * .1
 w2 = l * .28
 xn = x + xc + r * 1.1
 yn = y + yc
 xb = xn
 yb = yn
 CIRCLE (xb, yb), w1 * .25, , 90 * 3.14 / 180, 270 * 3.14
/ 180
```

```
    PSET (xn, yn), 1
    LINE -(xn, yn + w1)
    LINE -(xn + w, yn + w1)
    LINE -(xn + w, yn + w2)
    LINE -(xn + w * 1.14, yn + w2)
    LINE -(xn + w * 1.35, yn + w2)
    LINE -(xn + w * 1.35, yn - w2)
    LINE -(xn + w * 1.14, yn - w2)
    LINE -(xn + w, yn - w2)
    LINE -(xn + w, yn - w1)
    LINE -(xn, yn - w1)
    LINE -(xn, yn)

'PSET (xn, yn + w1 * .9), 1
   'LINE -(xn + 1, yn - w1 * .9)
   'ww = w1 * 1.9
   'LINE STEP(3, 0)-STEP(0, ww)
   'LINE STEP(3, 0)-STEP(0, -ww)
   'LINE STEP(3, 0)-STEP(0, ww)
   'LINE STEP(3, 0)-STEP(0, -ww)
   'LINE STEP(3, 0)-STEP(0, ww)

END SUB

SUB Label
  LOCATE 19, 28: PRINT "Top View ";
  LOCATE 10, 28: PRINT "Polished";
  LOCATE 11, 31: PRINT "Rod";
  LOCATE 11, 56: PRINT "Handle";
  LOCATE 19, 6: PRINT "Connector ";
END SUB
```

```
SUB LabelAxis
LOCATE 21, 1
PRINT "      -3         -2           1          0           1
     2         3  (MV/V)"
END SUB SUB MajorTicMark (x, y, iTicLength, iTicWidth)
LINE (x, y)-(x + iTicWidth, y + iTicLength), , BF
END SUB SUB MinorTicMark (StartX, StartY, iLength, iWidth)
LINE (StartX, StartY)-(StartX + iWidth, StartY + iLength),
, BF
END SUB SUB PlaceXlabel (TimeMax)
LOCATE 21, 10
PRINT "0"
LOCATE 21, 42
PRINT USING "##.##   (min.)"; TimeMax / 60 / 2
LOCATE 21, 76
PRINT USING "##.#"; TimeMax / 60

END SUB

SUB PlaceYlabel (ymin, ymax)
LOCATE 19, 1
PRINT USING "##.####"; ymin;
LOCATE 2, 1
PRINT USING "##.####"; ymax;
LOCATE 10, 2
PRINT "mV/V";
END SUB
```

'
' draw the triangle pointer on the axis
' note: get and put are used to copy and paste bit images.
'
'
```
SUB Pointer (iHeight, iWidth, PtrArray%())
x = 10
y = 10
iBytes = 4 + INT((iWidth * 1 + 7) / 8) * 1 * (iHeight)
REDIM PtrArray%(iBytes)
LINE (x, y)-(x + iWidth, y), 1
LINE -(x + (iWidth / 2), y + iHeight), 1
LINE -(x, y), 1
PAINT (x + (iWidth / 2), y + (iHeight / 2)), 2
GET (x, y)-(x + iWidth, y + iHeight), PtrArray%
LINE (x, y)-(x + iWidth, y + iHeight), 0, BF
END SUB SUB PolishedRod (x, y, l, h)
  yc = h * .85              'y-center of rod
  P = .6                    'percent of dist btwn a & e
  xc = P * (l * .75)        'x-center cord.
  r = (P * .75 - .25) * l   'radius, make circle tangent to f-g side
  CIRCLE (x + xc, y + yc), r
  CALL Handle(x, y, xc, yc, r, l, h)
END SUB
```

' ====[ P R X d u c e r Z e r o ]=====================================
' Purpose: Zero the Polished rod xducer and allow user to determine when

```
'            the drift of the reading is minimal for a reasonable reading
' XDUCER() - coefs for the xducer, note: 1,2, and 7 are used.  2 is loaded
'             in system setup file.
' T$()     - well file information array, needed to calculated buoyant weight
' PRTmode% - 0-manual mode  1-automatic mode
'
'
' CHANGE is the vehicle the carries progress.  Ideas are the fuel for this
' change.  They must keep flowing because progress is not very fuel efficient.
'
'
SUB PRXducerZero (XDUCER(), T$(), PRTmode%)
DIM Choices$(10), Cord%(10)
'*** FUNCTION KEY LIBRARY F1$  = CHR$(0) + CHR$(59)
        F2$  = CHR$(0) + CHR$(60)
        F3$  = CHR$(0) + CHR$(61)
        F4$  = CHR$(0) + CHR$(62)
        F5$  = CHR$(0) + CHR$(63)
        F6$  = CHR$(0) + CHR$(64)
        F7$  = CHR$(0) + CHR$(65)
        F8$  = CHR$(0) + CHR$(66)
        F9$  = CHR$(0) + CHR$(67)
        F10$ = CHR$(0) + CHR$(68)
        F11$ = CHR$(0) + CHR$(133)
        F12$ = CHR$(0) + CHR$(134)
        SF10$ = CHR$(0) + CHR$(93)
        ESC$ = CHR$(27)
```

```
          CR$ = CHR$(13)
DIM SCNDIAG(4), VPORT(4)
DIM ArrayLoadV(1000), ArrayTime(1000), LoadVMoving(20)
DIM GRlimits(2)

DIM WB(2)  'ROD weight information
'[1] - buoyant weight of rod
'[2] - buoyant weight + fluid weight
DIM DUMMY(10)
SCREEN 2
'*** ADC ASSEMBLY ROUTINE PARAMETERS
D% = 0                    'DUMMY INTEGER ARGUMENT
LoadCh% = 10              'HARDWARE CHAN FOR LOAD CELL
gain=27.667
ExcitationCh% = 11        'EXCITATION VOLTAGE gain=0.5
AccelCh% = 12             'HARDWARD CHAN FOR ACCEL
gain=27.667
CurrentCh% = 9            'HARDWARE CHAN FOR CURRENT PROBE
BITV = .000004770701#     'VALUE IN VOLTS OF LSB OF ADC idim% = 100
DIM PtrArray%(idim%)
iPtrWidth = 80       'width of triangle pointer in screen
cords.
iPtrHeight = 40      'height of triangle pointer in screen
cords.
iNumberDev = 6       'number of axis divisions
iAxisLength = 500    'length of axis in screen cords. (500
pixels long)
iXAxis = 50          'start x location of axis
iYAxis = 135         'start y location of axis PRTmode% = 0     '0-manual mode    1-automatic
```

InstallTop:

```
SCREEN 2: CLS
PRINT
PRINT "*** STEP #1 *****"
PRINT "Connect Polished Rod Transducer to Well Analyzer. Do not attach"
PRINT "transducer to polished rod."
PRINT
PRINT "*** STEP #2 *****"
PRINT "Observe transducer output.  The transducer output should be between"
PRINT "10 and 20 mV/V.  The readings will drift if the transducer is at a"
PRINT "different temperature than ambient temperature. This is normal."
PRINT "But, erratic readings indicate a defective transducer."
PRINT
PRINT
LOCATE 24, 1:
PRINT "Hit [ENTER] to Continue.";
LOCATE 25, 1
PRINT "ESC-Exit Polished Rod Transducer Installation.";
LOCATE 20, 1: PRINT USING "Transducer output = ####.## (mV/V) "; 0!;

iSample% = 20    'take 20 samples then average
ikey$ = INKEY$
WHILE (ikey$ <> CR$ AND ikey$ <> ESC$)
   IF (ikey$ = F1$ OR 1) THEN
      SumAveLoad& = 0!
      SumNormV& = 0!
      FOR j = 1 TO iSample%
```

```
        CALL dsampl(LD&, LoadCh%)
        CALL dsampl(l&, ExcitationCh%)   'EXCITATION
        SumAveLoad& = SumAveLoad& + LD&
        SumNormV& = SumNormV& + l&
    NEXT j
    AverageLoad& = SumAveLoad& / iSample%
    AverageNormV& = SumNormV& / iSample%
    LOADV = AverageLoad& * BITV / 27.667 * 1000
    NORMV = AverageNormV& * 2 * BITV
    LOCATE 20, 21: PRINT USING "####.##"; LOADV / NORMV;
  END IF
  ikey$ = INKEY$
WEND IF (ikey$ = ESC$) THEN
  PRTmode% = -99         'signal main that user aborted
  EXIT SUB
END IF
'
WichitaFalls:      'town way up North from here
'
CLS
CALL DrawAxis(iXAxis, iYAxis, iNumberDev, iAxisLength)
CALL LabelAxis
CALL Pointer(iPtrHeight, iPtrWidth, PtrArray%())
LOCATE 1, 1:
PRINT "*** STEP #3 *****"
PRINT "Stop polished rod at the bottom of the stroke. Position the"
PRINT "transducer on the polished rod as high as comfortable but at least "
PRINT "6 inches below the carrier bar."
PRINT
PRINT "*** STEP #4 *****"
```

```
PRINT "Gently turn T-handle until displayed output is
between +1 and -1 mV/V."
PRINT
LOCATE 10, 2: PRINT "ACTION:";
LOCATE 10, 50: PRINT "--TIGHTEN--";
LOCATE 10, 20: PRINT "--LOOSEN--";
CALL dsampl(LD&, LoadCh%)
LOADV = LD& * BITV / 27.667 * 1000

LOCATE 23, 1: PRINT USING "Transducer Output = ####.##
(mV/V)"; LOADV / NORMV;
LOCATE 25, 1: PRINT "Hit [ENTER] to Continue.";
RtLim = iXAxis + iAxisLength
LftLim = iXAxis
iXPtr = (LftLim + RtLim) \ 2
CALL SetPtr(iXPtr, iYAxis, iPtrWidth, iPtrHeight,
PtrArray%())

ikey$ = INKEY$
DO
  IF (LD& <> OLDLD& OR 1) THEN
    CALL SetPtr(iXPtr, iYAxis, iPtrWidth, iPtrHeight,
PtrArray%())
    LOADV = LD& * BITV / 27.667 * 1000
    'iXPtr = ((LoadV / NORMV) + 3) / 6! * iAxisLength +
iXAxis
    iXPtr = ((LOADV / NORMV) + 3) / 6! * 500 + 50
    IF (iXPtr < LftLim) THEN iXPtr = LftLim
    IF (iXPtr > RtLim) THEN iXPtr = RtLim
    CALL SetPtr(iXPtr, iYAxis, iPtrWidth, iPtrHeight,
PtrArray%())
    LOCATE 23, 21: PRINT USING "####.## "; LOADV / NORMV;
  END IF
  CALL dsampl(LD&, LoadCh%)
```

```
        ikey$ = INKEY$
LOOP WHILE (ikey$ <> CR$)
'
' pick rod size here
'
'CALL REFRESH
SCREEN 0: CLS PRINT
PRINT "* STEP #5 ***"
PRINT
PRINT "Select polished rod size. (Use ^Q-  -^P keys)"
Cord%(1) = 6      'y screen position
Cord%(2) = 5      'x screen positon
Choices$(1) = "1.125 (in)"
Choices$(2) = "1.25 (in)"
Choices$(3) = "1.5 (in)"
iMaxChoice% = 3: iPick% = 2    'DEFAULT PICK CALL ToggelList(Cord%(), Choices$(), iMaxChoice%, iPick%)

IF (iPick% = 1) THEN XDUCER(1) = .9
IF (iPick% = 2) THEN XDUCER(1) = 1!
IF (iPick% = 3) THEN XDUCER(1) = 1.2

CLS
PRINT "Accelerometer Check -";
SumAveAccel& = 0!
FOR j = 1 TO iSample%
   CALL dsampl(Accel&, AccelCh%)
   SumAveAccel& = SumAveAccel& + Accel&
NEXT j
```

```
AverageAccel& = SumAveAccel& / iSample%
Acceleration = AverageAccel& * BITV / 27.667 * 1000
Acceleration = Acceleration / NORMV
LOCATE 2, 1: PRINT USING "Accelerometer output is: ###.###
(mV/V)"; Acceleration
IF (Acceleration < -1!) THEN
   SCREEN 2
   WINDOW (0, 0)-(100, 100)
   PRINT " ": PRINT "NOTE: "
   PRINT "Please check for proper installation as shown.
Operator should invert"
   PRINT "polished rod transducer if upside down and
restart installation.";
   x = 20
   y = 20
   length = 45
   height = 45

CALL BaseUnit(x, y, length, height)
   CALL Connector(x, y, length, height)
   CALL PolishedRod(x, y, length, height)
   CALL Label
   LOCATE 24, 1: PRINT "Hit [ENTER] to continue.";
   LOCATE 23, 1: PRINT "ESC- Restart polished rod
installation procedure ";
   a$ = ""
   WHILE (a$ <> CR$ AND a$ <> ESC$): a$ = INKEY$: WEND
   CALL REFRESH
   IF (a$ = ESC$) THEN GOTO InstallTop
   SCREEN 0
   CLS
   PRINT
   PRINT "NOTE:"
```

```
   PRINT "Accelerometer transducer will NOT provide valid
position information "
   PRINT "in the current state.  A full dynamometer
analysis is impossible"
   PRINT "without this data."
ELSE
   PRINT " "
   PRINT "Normal accelerometer limits are between -1 and +1
mV/V.";
END IF
LOCATE 7, 1
PRINT "
┌─────────────────────────────────────────────────┐"
PRINT "         ║      POLISHED ROD TRANSDUCER
   ║"
PRINT "
╟─────────────────────────────────────────────────╢"
PRINT "         ║
   ║"
PRINT "         ║    Select Processing Option:
   ║"
PRINT "         ║
   ║"
PRINT "         ║       F1 - Automatic Proccessing
   ║"
PRINT "         ║
   ║"
PRINT "         ║       F2 - Manual Processing
   ║"
PRINT "         ║
   ║"
PRINT "
╟─────────────────────────────────────────────────╢"
```

```
PRINT "         ||       Esc - Return to STEP#1
    || "
PRINT "
   |L_____J| "

Diboll:      'my home town over yonder in East Texas
QQ$ = INKEY$
SELECT CASE QQ$
   CASE F1$
      XDUCER(7) = 0
      PRTmode% = 1    'automatic mode
      EXIT SUB
   CASE F2$
      GOTO ManualMode
   CASE ESC$                          'no need to save anything
the
      CALL REFRESH
      GOTO InstallTop
   CASE ELSE
      GOTO Diboll
END SELECT ManualMode:
CALL REFRESH
SCREEN 0
CLS
PRINT " "
PRINT " "
PRINT "*** STEP#6 ****"
PRINT " "
PRINT "The cable should be free to travel the entire
stroke.  Operate the "
PRINT "pumping unit for one minute.  Then, stop the unit
on the downstroke"
PRINT "near the bottom of the stroke."
```

```
PRINT " "
a$ = " "
LOCATE 24, 1: PRINT "Hit [ENTER] when finished."
WHILE (a$ <> CR$): a$ = INKEY$: WEND
CLS
'
' sample load, if > 1mv/v then need to readjust T-handle
'
LOCATE 15, 30: PRINT "Sampling Transducer..."
SumAveLoad& = 0!
SumNormV& = 0!
FOR j = 1 TO iSample%
   CALL dsampl(LD&, LoadCh%)
   CALL dsampl(1&, ExcitationCh%)   'EXCITATION
   SumAveLoad& = SumAveLoad& + LD&
   SumNormV& = SumNormV& + 1&
NEXT j
AverageLoad& = SumAveLoad& / iSample%
AverageNormV& = SumNormV& / iSample%
LOADV = AverageLoad& * BITV / 27.667 * 1000
NORMV = AverageNormV& * 2 * BITV
LOADV = LOADV / NORMV
IF (LOADV > 1!) THEN GOTO WichitaFalls
'
' graph mv/v reading vs. time, del time is approx. 10 sec.
'
iSample% = 20
CALL REFRESH
VPORT(1) = 10: VPORT(2) = 155: VPORT(3) = 70: VPORT(4) = 635
'GraphMin = LOADV * .8: GraphMax = LOADV * 1.2
GraphMin = LOADV - .05: GraphMax = LOADV + .05

SCNDIAG(2) = GraphMin
```

```
SCNDIAG(4) = GraphMax
OldLoadV = LOADV
LoadVMoving(1) = OldLoadV

LOCATE 23, 1: PRINT USING "Transducer Output= ####.###
(mV/V)        Transducer Drift= ###.### (Klbs/min)"; LOADV;
DelLoadPerMin;
LOCATE 25, 1: PRINT "Hit [ENTER] to Continue.";
ikey$ = INKEY$
NEWPT = 1: OLDPT = 1
TimeMax = 60
C2Kprt = XDUCER(2) * XDUCER(1)      ' C2 * Kprt
StartTime! = TIMER
GraphIsThere = 0
TimeStep% = 0
GraphChanged = 1
WaitForJim% = 5
MaxWait% = 5
DO
   SumAveLoad& = 0!
   FOR j = 1 TO iSample%
      CALL dsampl(LD&, LoadCh%)
      SumAveLoad& = SumAveLoad& + LD&
   NEXT j
   IntervalTime! = TIMER
   CALL dsampl(RawNormVoltage&, ExcitationCh%)    'EXCITATION AverageLoad& = SumAveLoad& / iSample%
   LOADV = AverageLoad& * BITV / 27.667 * 1000
   NORMV = RawNormVoltage& * 2 * BITV
   LOADV = LOADV / NORMV ArrayLoadV(NEWPT) = LOADV
   ArrayTime(NEWPT) = IntervalTime! - StartTime!
```

```
IF (NEWPT < 16) THEN
   LeftPoint% = 1
ELSE
   LeftPoint% = NEWPT - 15
END IF
OldLoadV = ArrayLoadV(LeftPoint%)

DelLoadV = LOADV - OldLoadV ikey$ = INKEY$
DelLoadLbs = C2Kprt * DelLoadV
DelTime = ArrayTime(NEWPT) - ArrayTime(LeftPoint%)
IF (DelTime < .5) THEN DelTime = 1!
DelLoadPerMin = DelLoadLbs / DelTime * 60!
LOCATE 23, 60: PRINT USING "###.###"; DelLoadPerMin
LOCATE 23, 20: PRINT USING "####.###"; LOADV;

IF (LOADV < GraphMin) THEN
   GraphMin = LOADV
   SCNDIAG(2) = GraphMin
   GraphChanged = 1
ELSEIF (LOADV > GraphMax) THEN
   GraphMax = LOADV
   SCNDIAG(4) = GraphMax
   GraphChanged = 1
END IF
IF (GraphChanged = 1) THEN
   GraphChanged = 0
   GRlimits(1) = GraphMin
   GRlimits(2) = GraphMax
   SCNDIAG(1) = ArrayTime(1)
   SCNDIAG(3) = TimeMax
   IF (WaitForJim% = MaxWait%) THEN
      CALL REFRESH
```

```
        CALL GPLOTR.R(ArrayTime(), ArrayLoadV(), 1!, NEWPT,
SCNDIAG(), VPORT())
'       CALL MKTICS(1, GRlimits(), ArrayTime(1), TimeMax,
1!, .5, 0)
        LOCATE 23, 1: PRINT USING "Transducer Output=
####.### (mV/V)      Transducer Drift= ###.###
(Klbs/min)"; LOADV; DelLoadPerMin;
        LOCATE 25, 1: PRINT "Hit [ENTER] to continue when
satisfied with drift.";
        CALL PlaceYlabel(GraphMin, GraphMax)
        CALL PlaceXlabel(TimeMax)
        GraphIsThere = 1
        WaitForJim% = 0
        OLDPT = NEWPT
    END IF
  ELSE
    IF (GraphIsThere = 1 AND WaitForJim% = MaxWait%) THEN
      CALL GPLOTR.R(ArrayTime(), ArrayLoadV(), OLDPT,
NEWPT, SCNDIAG(), VPORT())
      WaitForJim% = 0
      OLDPT = NEWPT
    END IF
  END IF IF (NEWPT > 999) THEN
    NEWPT = 1: OLDPT = 1
    StartTime! = TIMER
  END IF IF (ArrayTime(NEWPT) > 30 * TimeStep%) THEN
    TimeStep% = TimeStep% + 1
    IF (GraphIsThere = 1) THEN
      TimeMax = 30 * TimeStep%
    ELSE
```

```
      TimeMax = 30
   END IF
   CALL REFRESH
   SCNDIAG(1) = ArrayTime(1)    ': SCNDIAG(2) = GraphMin *
.85
   SCNDIAG(3) = TimeMax         ':        SCNDIAG(4) =
GraphMax * 1.15
   CALL GPLOTR.R(ArrayTime(), ArrayLoadV(), 1!, NEWPT,
SCNDIAG(), VPORT())
   LOCATE 23, 1: PRINT USING "Transducer Output= ####.###
(mV/V)        Transducer Drift= ###.### (Klbs/min)"; LOADV;
DelLoadPerMin;
   LOCATE 25, 1: PRINT "Hit [ENTER] to continue when
satisfied with drift.";
   CALL PlaceYlabel(GraphMin, GraphMax)
   CALL PlaceXlabel(TimeMax)
   GraphIsThere = 1
   OLDPT = NEWPT
  END IF '  OLDPT = NEWPT
  NEWPT = NEWPT + 1
  WaitForJim% = WaitForJim% + 1

LOOP WHILE (ikey$ <> "Q" AND ikey$ <> CR$)
'
'**** RETURN LAST READING FROM TRANSDUCER
'
  SumAveLoad& = 0
  FOR j = 1 TO iSample%
    CALL dsampl(LD&, LoadCh%)
    SumAveLoad& = SumAveLoad& + LD&
  NEXT j
  CALL dsampl(RawNormVoltage&, ExcitationCh%)    'EXCITATION
```

```
    AverageLoad& = SumAveLoad& / iSample%
    LOADV = AverageLoad& * BITV / 27.667 * 1000
    NORMV = RawNormVoltage& * 2 * BITV
    LOADV = LOADV / NORMV       ' mV/V '
'**** Calculate buoyant wieght of rods
'
CALL CALWB(WB(), DEPTH, T$(), DUMMY())
WB(1) = WB(1) / 1000!
CALL REFRESH
SCREEN 0
LOCATE 3, 10: PRINT " TRANSDUCER CALIBRATION ";
PRINT " "
PRINT
PRINT "Hit F1  to calibrate transducer output to a calculated "
PRINT USING "         buoyant rod weight of........................... #####.### (Klbs)"; WB(1);
PRINT " "
PRINT
PRINT "Hit F2  to calibrate transducer output to a predetermined"
IF (VAL(T$(43)) = 0) THEN
   PRINT "          measured buoyant rod weight of................... ** NWF **"
ELSE
   PRINT USING "          measured buoyant rod weight of................... #####.### (Klbs)"; VAL(T$(43));
END IF
PRINT " "
PRINT
PRINT "Hit F3  to calibrate transducer output to a operator "
```

```
PRINT "          selected load.";
PRINT " "
PRINT
PRINT "    { *NWF - Not Present in Well File. }"

XDTOP: QQ$ = INKEY$
SELECT CASE QQ$
   CASE F1$
      GivenLoad = WB(1)
   CASE F2$
      GivenLoad = VAL(T$(43))
   CASE F3$
      LOCATE 19, 1: PRINT "Operator must enter load for transducer in pounds";
      LOCATE 21, 15: PRINT "(pounds)";
      LOCATE 21, 5: INPUT ; GivenLoad
      GivenLoad = GivenLoad / 1000   'cnvt to Klbs
   CASE SF10$
      LOCATE 19, 1: PRINT "Operator must enter load for transducer in pounds";
      LOCATE 21, 15: PRINT "(pounds)";
      LOCATE 21, 5: INPUT ; GivenLoad
      GivenLoad = GivenLoad / 1000   'cnvt to Klbs
   CASE ELSE
      GOTO XDTOP
END SELECT
'
' Calculation of OFFSET using given Load
'
XDUCER(7) = GivenLoad - XDUCER(2) * LOADV * XDUCER(1)

IF (QQ$ = SF10$) THEN
   PRINT " "
   PRINT "LOADV  = "; LOADV; " (mV/V) "
```

```
    PRINT "CURRENT LOAD READING = "; XDUCER(2) * LOADV *
XDUCER(1); " (Klbs)"
    PRINT "offset = "; XDUCER(7); " (Klbs) "
    PRINT "C2     = "; XDUCER(2); " (Klbs/mV/V)"
    PRINT "prt    = "; XDUCER(1); " "
    INPUT iixxii
END IF
CALL REFRESH

END SUB

SUB SetPtr (x, y, iWidth, iHeight, PtrArray%())

PUT (x - (iWidth / 2), y - iHeight), PtrArray%, XOR

END SUB

'NOTICE !!!!
'this section was extracted from dyno.bas
'the following code deals with the display of data acquired using
'the Polished Rod Transducer 'This section deals with acquiring PRT data
' The routine PRXducerZero is found in PRT.BAS.  This calibrates the
' transducer '
'
PRT-----------------------------------------------------------
------------
```

```
' Calibrate Polished Rod Transducer if TRANSDUCER type = 1
'
---------------------------------------------------------------------
IF (XducerType% = 1) THEN
   CALL PRXducerZero(XDUCER(), T$(), PRTmode%)   'in PRT.BAS
   IF PRTmode% = -99 THEN           'user aborted exit
      CALL dstop(POFF%)
      CALL power(POFF%)
      CALL fini(POFF%)
      EXIT DEF                      '%ksc where to go from here ?????
   END IF
'================================================================
'
'**** Dialog box, make sure user has unit on before proceding
'
SCREEN 0: CLS
'IF PRTmode% = 1 THEN
 CALL TurnOnUnitMSG
'END IF PRTDYNACQ:
   FDATYP% = 1
   ABRT% = 0:   'abort flag off and capture mode flag off
   CALL REFRESH
   RNG.DAT(1) = 10: RNG.DAT(2) = 20: NDPT = 4
'*** plot a dummy graph so the user has something to look at while scaling
   CALL PLTLOAD(RNG.DAT(13), RNG.DAT(14), DUMLOAD&(), RNG.DAT(), SBUF$(), NDPT, FCYC%, PZX())
      LOCATE 1, 1: PRINT "Dynamometer Acquisition          ";
```

```
   P% = 0
   CALLS dbread(LOAD&(1), accel&(1), CH1%, CH2%, DG%, P%,
Q%, INPK%(1), IPPK%(1), CH3%)
   OLDP = 1
   CAPTMODE = 1
   IF FSCL% = 1 THEN
      NOCURR% = 0    'FLAG- for motor current
      IFILT = 0
      RNG.DAT(1) = 999999: RNG.DAT(2) = -999999
      RNG.DAT(3) = 999999: RNG.DAT(4) = -9999999
      RNG.DAT(5) = 999999: RNG.DAT(6) = -999999
      CALL ClrDialog
      LOCATE 23, 5: PRINT "**** Scaling incomimg data,
Please Wait 15 Seconds...";
      LOCATE 24, 1: PRINT "ESC-Will stop scaling and return
to Startup Screen";
      IFILT = 0
      WHILE ABRT% = 0 AND P% < 300       'waiting for a good
sample of data
         P = P%                           '300 pts = 15
seconds
         aa$ = INKEY$
         IF aa$ = ESC$ THEN ABRT% = 1    'wants out of
scale
         FOR I% = OLDP TO P              'convert section of
data just acqur'd
            CURRENT& = IPPK%(I%)
            CURRENT& = CURRENT& - INPK%(I%)
            IFILT = IFILT + .2 * (CURRENT& - IFILT)
            CURRENT(I%) = IFILT / ICONST
            IF CURRENT(I%) > RNG.DAT(6) THEN RNG.DAT(6) =
CURRENT(I%)
            IF OLDP > 100 THEN          'wait a bit before range
checking CURRENT data
```

```
        IF CURRENT(I%) < RNG.DAT(5) THEN RNG.DAT(5) =
CURRENT(I%)
        END IF
        IF LOAD&(I%) > RNG.DAT(2) THEN RNG.DAT(2) =
LOAD&(I%)
        IF LOAD&(I%) < RNG.DAT(1) THEN RNG.DAT(1) =
LOAD&(I%)
        IF accel&(I%) > RNG.DAT(4) THEN RNG.DAT(4) =
accel&(I%)
        IF accel&(I%) < RNG.DAT(3) THEN RNG.DAT(3) =
accel&(I%)
      NEXT I%
      OLDP = P
    WEND
    FOR II = 1 TO 5
      CURRENT(II) = CURRENT(6)
    NEXT II
    IF ABRT% = 1 THEN         'user aborted the scaling
routine
      CALL dstop(POFF%)
      CALL power(POFF%)
      CALL fini(POFF%)
      EXIT DEF                '%ksc where to go from here
?????
    END IF
    FSCL% = 0
'
'**** CHECK FOR NO DELTA IN LOAD DATA, SET MIN=0 MAX =1.0
'
    IF (RNG.DAT(1) = RNG.DAT(2)) THEN
      IF (RNG.DAT(2) = 0) THEN
        RNG.DAT(2) = 1
      ELSE
        RNG.DAT(2) = RNG.DAT(2) * 1.1
```

```
        RNG.DAT(1) = RNG.DAT(1) * .9
      END IF
    END IF

CALL CalcLoad(XDUCER(), RNG.DAT(), NORMV, XducerType%)
    SCNDIAG(1) = 1: SCNDIAG(3) = 1200
    SCNDIAG(2) = RNG.DAT(1): SCNDIAG(4) = RNG.DAT(2)
    LOCATE 5, 1: PRINT USING "###.##"; RNG.DAT(14)
    LOCATE 17, 1: PRINT USING "###.##"; RNG.DAT(13)
    CALL GPLOTLI.S(LOAD&(), 1!, 300!, SCNDIAG(), VPORT())
    CALL MKTICS(13, RNG.DAT(), 1, 1200, 5, 1, 0)
    OLDP = 299
    CALL ZEROCHK(RNG.DAT(), 5, 6, TMIN, TMAX)
    IF TMIN = (-1) AND TMAX = (-1) THEN
       NOCURR% = 1   'flag-no motor current present
         LOCATE 21, 1: PRINT "[NO MOTOR CURRENT DETECTED!]";
    END IF
  END IF
  CALL ClrDialog
  LOCATE 23, 1: PRINT "CAPTURING 1 minute of Dynamometer data, please wait...";
  LOCATE 25, 1: PRINT "To Change Display Enter: F4-Load  F5-Acceleration  F6-Current";
  FPT% = 1
  WHILE ABRT% = 0
    P = P%
    FOR I% = OLDP TO P
      CURRENT& = IPPK%(I%)
      CURRENT& = CURRENT& - INPK%(I%)
      IFILT = IFILT + .2 * (CURRENT& - IFILT)
      CURRENT(I%) = IFILT / ICONST
    NEXT I%
    IF FPT% = 1 THEN
       CALL GPLOTLI.S(LOAD&(), OLDP, P, SCNDIAG(), VPORT())
```

```
        ELSEIF FPT% = 2 THEN
           CALL GPLOTLI.S(accel&(), OLDP, P, SCNDIAG(),
VPORT())
        ELSEIF FPT% = 3 AND NOCURR% = 0 THEN
           CALL GPLOTR.S(CURRENT(), OLDP, P, SCNDIAG(),
VPORT())
        END IF
        OLDP = P
        IF P% > MXTIM THEN      'are the number of samples past
the alotted time?
           CALL dstop(POFF%)    'stop reading and send the
process back through
           ABRT% = 50
        END IF
        aa$ = INKEY$
        SELECT CASE aa$
           CASE F4$    'PLOT LOAD
              FPT% = 1
              SCNDIAG(2) = RNG.DAT(1): SCNDIAG(4) = RNG.DAT(2)
              TITLE$ = "LOAD   Vs   TIME": UNITS$ = "Klbs":
PARM$ = "  LOAD  "
              CALL GLABEL(TITLE$, UNITS$, PARM$, RNG.DAT(13),
RNG.DAT(14), 0)
              VIEW (75, 20)-(630, 145), 0, 1     'ZAP all that
is in the VP
              CALL GPLOTLI.S(LOAD&(), 1!, P, SCNDIAG(), VPORT())
              CALL MKTICS(13, RNG.DAT(), 1, 1200, 5, 1, 0)
              LINE (1, RNG.DAT(1))-(1200, RNG.DAT(1)), , ,
&HAFAF
              LINE (1, RNG.DAT(2))-(1200, RNG.DAT(2)), , ,
&HAFAF
           CASE F5$    'PLOT ACCELERATION
              FPT% = 2
              SCNDIAG(2) = RNG.DAT(3): SCNDIAG(4) = RNG.DAT(4)
```

```
        TITLE$ = "ACCELER vs TIME ": UNITS$ = "mV/V":
PARM$ = " ACCEL  "
        CALL GLABEL(TITLE$, UNITS$, PARM$, RNG.DAT(3) /
NORMV, RNG.DAT(4) / NORMV, 0)
        VIEW (75, 20)-(630, 145), 0, 1      'ZAP all that
is in the VP
        CALL GPLOTLI.S(accel&(), 1!, P, SCNDIAG(),
VPORT())
        LINE (1, RNG.DAT(3))-(1200, RNG.DAT(3)), , ,
&HAFAF
        LINE (1, RNG.DAT(4))-(1200, RNG.DAT(4)), , ,
&HAFAF
    CASE F6$    'PLOT CURRENT
        FPT% = 3
        SCNDIAG(2) = RNG.DAT(5): SCNDIAG(4) = RNG.DAT(6)
        UNITS$ = "Amps": PARM$ = "CURRENT": TITLE$ =
"CURRENT VS TIME"
        CALL GLABEL(TITLE$, UNITS$, PARM$, RNG.DAT(5),
RNG.DAT(6), 0)
        VIEW (75, 20)-(630, 145), 0, 1      'ZAP all that
is in the VP
        IF NOCURR% = 1 THEN
            LOCATE 11, 28: PRINT "NO MOTOR CURRENT
DETECTED!";
        ELSE
            CALL GPLOTR.S(CURRENT(), 1!, P, SCNDIAG(),
VPORT())
            LINE (1, RNG.DAT(5))-(1200, RNG.DAT(5)), , ,
&HAFAF
            LINE (1, RNG.DAT(6))-(1200, RNG.DAT(6)), , ,
&HAFAF
        END IF
    CASE ESC$
```

```
        IF CAPTMODE = 0 THEN ABRT% = 99   'do not allow
escape from 1 min. acq.
    END SELECT
  WEND
  CALL dstop(POFF%)       'stop phantom data acqusition
routine
  CURRENT(1) = CURRENT(2)
  IF ABRT% = 1 THEN GOTO PRTDYNACQ      'return to begining
to redo data acq.
    IF ABRT% = 99 THEN                  'user aborted
      CALL power(POFF%)    'turn power off to save battery
life
      CALL fini(POFF%)
      EXIT DEF
    END IF
  NDPT = 1199
  FINFO(1) = NDPT         'number of data points
  FINFO(2) = NORMV        'normalization voltage
  CALL REFRESH
  CALL PWINDLI(LOAD&(), 10, NDPT, RNG.DAT(1), RNG.DAT(2))
  CALL PWINDLI(accel&(), 10, NDPT, RNG.DAT(3), RNG.DAT(4))
  CALL CalcLoad(XDUCER(), RNG.DAT(), NORMV, XducerType%)
  CALL PLTLOAD(RNG.DAT(13), RNG.DAT(14), LOAD&(),
RNG.DAT(), SBUF$(), NDPT, FCYC%, PZX())
  CALL MKTICS(13, RNG.DAT(), 1, NDPT, 5, 1, 0)
  CALL ClrDialog
  LOCATE 23, 5: PRINT "Hit [ENTER] to continue or type
[N]o to repeat acquisition:";
  INPUT ; ANS$
  FSCL% = 1               'rescale 15 seconds ?????
  IF UCASE$(ANS$) = "NO" OR UCASE$(ANS$) = "N" THEN GOTO
PRTDYNACQ
  CALL power(POFF%)        'turn power off to save battery
life
```

TEMPJUMP:

```
   CALL ClrDialog
   LOCATE 23, 1: PRINT "...Calculating Load and Position
Data, Please Wait."
   FOR II = 1 TO 20      'flag array determines if load for
a particular
      LDFLG(II) = 0       'cycle has already been
calculated.
   NEXT II               '[0]-raw data   [1]-modified
(corrected with cubic)
   CALL PWINDLI(LOAD&(), 10, NDPT, RNG.DAT(1), RNG.DAT(2))
   CALL PWINDLI(accel&(), 10, NDPT, RNG.DAT(3), RNG.DAT(4))
   CALL CalcLoad(XDUCER(), RNG.DAT(), NORMV, XducerType%)
   CALL DATCNV(FINFO(), accel&(), RNG.DAT(), XDUCER(),
VELO(), POSITION(), PZX(), IP, MPPK())
   IF IP <> (-99) THEN
      GOSUB ANLSYS
   END IF IF (PRTmode% = 1 OR (XducerType% = 1 AND ATOD% = 0)) THEN
'
'***PRT Automatic Mode, allow user to select stroke
'        PRTmode% = 1 for automatic mode
'
PRTPrompt1:
```

```
    CALL ClrDialog

LOCATE 24, 1: PRINT "Enter number of stroke for analysis
"; : INPUT ; iPRTStroke
    IF iPRTStroke < 1 OR iPRTStroke > Strokes% THEN GOTO
PRTPrompt1
    N = iPRTStroke
    FourCardDispFLG% = 1: FSS% = 1
    AllowTorqFLG% = 1
    CALL REFRESH
    DATEREC$ = LTRIM$(RTRIM$(SBUF$(4)))
    TIMEREC$ = LTRIM$(RTRIM$(SBUF$(5)))
    LOCATE 1, 8: PRINT "WELL ID "; SBUF$(6); SPACE$(5);
"DATE "; DATEREC$; SPACE$(5); "TIME "; TIMEREC$;
SPACE$(5); "STROKE # "; N;
'
'** P L O T   S U R F A C E   C A R D
'   upper right
    LOCATE 25, 1: PRINT "...converting voltage readings to
load (lbs.) - please wait";
    FOR lk = 1 TO Strokes%
       CALL MLOAD(LOAD&(), XDUCER(), NORMV, CORLOAD(),
PZX(lk), PZX(lk + 1), XducerType%)
       LDFLG(lk) = 1           'flag-Signal conversion for
this cycle is in place
    NEXT lk
    LOCATE 25, 1: PRINT "
                             ";
    CALL ClrDialog
    LOCATE 23, 1: PRINT "...calculating Pump Card from
surface information - please wait";
    LOCATE 25, 1: PRINT " *** using damping factor of ";
DPARAMS(1); " for calculation.";
    IBEG% = PZX(N)
```

```
    IEND% = PZX(N + 1)
    TASIZE% = 1250
'   $DYNAMIC
    DIM FP(TASIZE%)
    DIM UP(TASIZE%)
    CALL DIAG1(CORLOAD(), POSITION(), FP(), UP(), IBEG%,
IEND%, DPARAMS(), T$(), XITC%)
    IF XITC% = 31 THEN
      LOCATE 16, 52: PRINT "Unable to calculate";
      LOCATE 17, 52: PRINT "    Pump Card!";
      GOTO 304
    END IF CALL PWINDR(FP(), PZX(N), PZX(N + 1), FPMIN, FPMAX)
    CALL AdjustLoad(Strokes%, PZX(), CORLOAD(), FPMIN,
XDUCER())

RNG.DAT(13) = RNG.DAT(13) - FPMIN / 1000
    RNG.DAT(14) = RNG.DAT(14) - FPMIN / 1000
    CALL PLTUR(N, PZX(), RNG.DAT(), CORLOAD(), POSITION())
'
'** C A L C U L A T E   &   P L O T   D O W N H O L E   C A R
D
' lower right
    CALL PWINDR(UP(), PZX(N), PZX(N + 1), RNG.DAT(19),
RNG.DAT(20))

CALL PWINDR(UP(), PZX(N), PZX(N + 1), RNG.DAT(19),
RNG.DAT(20))
    CALL PLTLR(N, PZX(), RNG.DAT(), FP(), UP(), T$(),
DPARAMS(), 1)
    ERASE FP
    ERASE UP
```

```
'
'** P L O T   L O A D
'
  CALL PLTUL(N, PZX(), RNG.DAT(), LOAD&())
'
'** P L O T   C U R R E N T
' lower left
  CALL PLTLL(N, PZX(), RNG.DAT(), CURRENT())

CALL ClrDialog
  LOCATE 23, 10: PRINT "*** SCREEN SAVE ***";
  LOCATE 24, 5: PRINT "Hit [ENTER] to save SCREEN or type [N]o to not save:";
  INPUT ; ANS$
  IF UCASE$(ANS$) <> "N" AND UCASE$(ANS$) <> "NO" THEN
    GXTE$ = ".^PC"
    CALL ClrDialog
    LOCATE 24, 2: PRINT "The downhole card was calculated with a Damping Factor of ["; DPARAMS(1); "]";
    CALL GGSCRN(GXTE$, SE$(), T$(), XITC%)
  END IF
  GOTO 304
END IF
'
'*** end of PRT section
'
```

What is claimed is:

1. A method for determining load or changes in axial load on a polished rod of a pumping system wherein the rod extends down a borehole to a downhole pump and the rod is reciprocated by a surface unit to cause the downhole pump to lift fluid up through the borehole, the method comprising the steps of:

coupling a transducer to opposite longitudinal sides of said rod by applying a compressive force to said rod by said transducer at a single point along the length of said rod wherein said compressive force is applied in a direction normal to the axis of said rod, generating a signal by said transducer in response to applying said compressive force to said rod wherein said signal is a function of said compressive force on said rod, digitizing said signal to produce a digital data set, storing said digital data set, and processing said digital data set in conjunction with a calibration factor for said transducer to determine the loads on said rod.

2. A method for determining load or changes in load on a polished rod as set forth in claim 1 wherein the step of processing said digital data set is modified by a polished rod size factor to calibrate the load on said rod as a factor of the diameter of said rod.

3. A method for determining load or changes in load on a polished rod as set forth in claim 1 including the steps of acquiring acceleration data for said polished rod and processing said acceleration data to determine positions for said polished rod.

4. A method for determining load or changes in load on a polished rod as set forth in claim 1 including a step of displaying said digital data set as a waveform on a display screen.

5. A method for determining load or changes in load on a polished rod as set forth in claim 1 including a step of displaying said digital data set as a dynamometer card of load versus position on a display screen.

6. A method for determining load or changes in load on a polished rod as set forth in claim 1 including a step of collecting position related information for said rod concurrently with said step of generating a signal.

7. A method for determining load or changes in load on a polished rod as set forth in claim 1 including a step of processing said digital data set in conjunction with physical configuration information for said rod to produce a second digital data set representing a downhole pump card.

8. A method for determining load or changes in load on a polished rod as set forth in claim 7 including a step of displaying said downhole pump card on a display screen.

9. A method for determining load or changes in load on a polished rod as set forth in claim 7 including a step of processing said second digital data set representing said downhole pump card to determine an offset load value which modifies said second digital data set to set the minimum load valve at a predetermined load.

10. A method for determining load or changes in load on a polished rod as set forth in claim 9 wherein said predetermined load is zero load.

11. A method for determining load or changes in load on a polished rod as set forth in claim 9 including a step of displaying said modified second digital data set on a display screen.

12. A method for determining absolute load on a polished rod of a pumping system wherein the rod extends down a borehole to a downhole pump and the rod is reciprocated by a surface unit to cause the downhole pump to lift fluid up through the borehole, the method comprising the steps of:

measuring changes in load on said polished rod during at least one pump cycle by detecting changes in diameter of said polished rod, said changes in diameter being determined by coupling a transducer to opposite longitudinal sides of said rod by applying a compressive force to said rod by said transducer at a single point along the length of said rod, determining the position of said polished rod by collecting position related information during said step of measuring changes in load on said polished rod, generating a downhole card by use of said measured changes in load, said position related information and known physical configuration of said rod, applying an offset value to said downhole card to shift said downhole card to have a predetermined minimum pump load, generating a surface card by use of said measured changes in said load on said polished rod and said determined position of said polished rod, and adjusting said surface card by said offset value to produce an absolute value surface card.

13. A method for determining-absolute load on a polished rod as recited in claim 12 wherein said predetermined pump load is zero.

14. A method for determining absolute load on a polished rod as recited in claim 12 including the step of displaying said absolute value surface card on a display screen.

15. A method for determining absolute load on a downhole pump of a pumping system wherein a rod extends from the surface down a borehole to the downhole pump and the rod is reciprocated by a surface unit to cause the downhole pump to lift fluid up through the borehole, the method comprising the steps of:

coupling a transducer to opposite longitudinal sides of said rod by applying a compressive force to said rod by said transducer, at a single point along the length of said rod wherein said compressive force is applied in a direction normal to the axis of said rod, deforming said transducer in response to applying said compressive force to said rod, generating a signal by said transducer in response to said compressive force applied by said transducer wherein said compressive force varies in response to changes in axial load on said rod, determining the position of said rod by collecting position related data during at least one cycle of said pump, generating a downhole card by use of said signal produced by said transducer, said position related data and a known physical configuration of said rod, and applying an offset value to said downhole card to shift said downhole card to have a minimum pump load of approximately zero to produce a downhole card representing absolute load on said downhole pump.

16. A method for acquiring and displaying data associated with axial loads on a polished rod of a pumping system wherein the rod extends down a borehole to a downhole pump and the rod is reciprocated by a surface unit to cause the downhole pump to lift fluid up through the borehole, the method comprising the steps of:

securing a transducer to said polished rod by applying a transverse compressive force on said rod by said transducer at a single point along the length of said rod wherein said compressive force deforms said transducer and wherein a change is said compressive force is a function of the axial lead on said rod and wherein said transducer produces an output signal corresponding to the axial loads on said rod, digitizing said output signal to produce a set of digitized rod change in axial loading dam, storing said axial lead data, and displaying said set of data representing change in axial lead on said polished rod as a waveform as a function of time on a screen.

17. A method for acquiring and displaying data as recited in claim 16 wherein the step of securing comprises securing the transducer to said rod which has one of a plurality of diameters.

18. A method for acquiring and displaying data associated with axial loads on a polished rod of a pumping system wherein the rod extends down a borehole to a downhole pump and the rod is reciprocated by a surface unit to cause the downhole pump to lift fluid up through the borehole, the method comprising the steps of:

securing a lead transducer to said polished rod to apply a transverse compressive force on said rod by said transducer at a single point along the length of said rod to measure change in the axial lead on said rod and wherein said lead transducer produces a lead output signal corresponding to change in compressive force on said rod, securing a position related data transducer to said polished rod to measure position of said rod and wherein said position related data transducer produces an output signal related to the position of said polished rod, digitizing said load output signal to produce a set of digitized change in compressive force data and digitizing said output signal to produce a set of digitized rod position related data, storing said change in compressive force data and said rod position related data, processing said change in compressive force data in conjunction with said rod position related data to produce a set of data representing changes in the axial load on said polished rod as a function of rod position, and displaying said set of data representing changes in the axial load on said polished rod as a waveform as a function of rod position on a screen.

19. A method for acquiring and displaying data as recited in claim 18 wherein said position related data transducer measures acceleration of said polished rod.

20. A method for acquiring and displaying data associated with axial loads on a downhole pump of a pumping system wherein a polished rod is at the surface end of a rod string that extends down a borehole to the downhole pump and the rod string is reciprocated by a surface unit to cause the downhole pump to lift fluid up through the borehole, the method comprising the steps of:

securing a load transducer to said polished rod to apply a transverse compressive force to said rod by said transducer at a single point along the length of said rod to measure change in the axial load on said rod and wherein said load transducer produces a load output signal corresponding to change in the compressive force on said rod, securing a position related data transducer to said polished rod to measure position of said polished rod and wherein said position related data transducer produces an output signal related to the position of said polished rod and therefore the position of said downhole pump, digitizing said load output signal to produce a set of digitized change in compressive force data and digitizing said output signal to produce a set of digitized rod position related data, storing said rod change in compressive force data and said rod position related data, processing said change in compressive force data in conjunction with said rod position related data and physical information describing said rod string to produce a set of data representing changes in axial load on said downhole pump as a function of pump position, and displaying said set of data representing changes in axial load on said downhole pump as a waveform as a function of pump position on a screen.

21. A method for acquiring and displaying data as recited in claim 20 wherein said position related data transducer measures acceleration of said polished rod.

22. A method for acquiring and displaying data associated with axial loads on a downhole pump of a pumping system wherein a polished rod is at the surface end of a rod string that extends down a borehole to the downhole pump and the rod string is reciprocated by a surface unit to cause the downhole pump to lift fluid up through the borehole, the method comprising the steps of:

securing a load transducer to said polished rod to apply a transverse compressive force on said rod by said load transducer at a single point along the length of said rod to measure change in compressive force on said rod wherein the change in compressive force is a function of the axial load on said rod and wherein said load transducer produces a load output signal corresponding to the change in compressive force on said rod, securing a position related data transducer to said polished rod to measure position of said polished rod and wherein said position related data transducer produces an output signal related to the position of said polished rod and therefore the position of said downhole pump, digitizing said load output signal to produce a set of digitized rod change in compressive force data and digitizing said output signal to produce a set of digitized rod position related data, storing said rod change in compressive force data and said rod position related data, processing said rod change in compressive force data in conjunction with said rod position related data and physical information describing said rod string to produce a set of data representing changes in the axial load on said downhole pump as a function of time, and displaying said set of data representing changes in load on said downhole pump as a waveform as a function of time on a screen.

23. A method for acquiring and displaying data as recited in claim 22 wherein said position transducer measures acceleration of said polished rod.

24. A method for acquiring and displaying data associated with absolute axial loads on a downhole pump of a pumping system wherein a polished rod is at the surface end of a rod string that extends down a borehole to the downhole pump and the rod string is reciprocated by a surface unit to cause the downhole pump to lift fluid up through the borehole, the method comprising the steps of:

securing a load transducer to said polished rod to apply a transverse compressive force on said rod by said load transducer at a single point along the length of said rod to measure change in the axial load on said rod and wherein said load transducer produces a load output signal corresponding to change in the compressive force on said rod, securing a position related data transducer to said polished rod to measure position of said polished rod and wherein said position related data transducer produces an output signal related to the position of said polished rod and therefore the position of said downhole pump, digitizing said load output signal to produce a set of digitized rod change in compressive force data and digitizing said output signal to produce a set of digitized rod position related data, storing said rod change in compressive force data and said rod position related data, processing said rod change in compressive force data in conjunction with said rod position related data and physical information describing said rod string to produce a set of data representing absolute load on said downhole pump as a function of pump position, and displaying said set of data representing absolute load on said downhole pump as a waveform as a function of pump position on a screen.

25. A method for acquiring and displaying data as recited in claim 24 wherein said position transducer measures acceleration of said polished rod.

26. A method for acquiring and displaying data associated with absolute axial loads on a polished rod of a pumping system wherein the polished rod is at the surface end of a rod string that extends down a borehole to a downhole pump and the rod string is reciprocated by a surface unit to cause the downhole pump to lift fluid up through the borehole, the method comprising the steps of:

securing a load transducer to said polished rod to apply a transverse compressive force on said rod by said load transducer at a single point along the length of said rod to measure change in compressive force on said rod wherein the change in compressive force is a function of the axial load on said rod and wherein said load transducer produces a load output signal corresponding to the change in compressive force on said rod, securing a position related data transducer to said polished rod to measure position of said polished rod and wherein said position related data transducer produces an output signal related to the position of said polished rod and therefore the position of said downhole pump, digitizing said load output signal to produce a set of digitized rod change in compressive force data and digitizing said output signal to produce a set of digitized rod position related data, storing said rod change in compressive force data and said rod position related data, processing said rod change in compressive force data in conjunction with said rod position related data to produce a set of data representing absolute loads on said polished rod as a function of rod position, and displaying said set of data representing absolute loads on said polished rod as a waveform which is a function of said polished rod position on a screen.

27. A method for acquiring and displaying data as recited in claim 26 wherein said load transducer measures changes in diameter of said polished rod.

28. A method for acquiring and displaying data as recited in claim 26 including the step of processing said digitized rod change in diameter data, said digitized rod position related data and rod physical information data to produce a surface card.

29. A method for acquiring and displaying data as recited in claim 26 wherein said position transducer measures acceleration of said polished rod.

30. A method for analyzing the performance of an oil well pumping system having a reciprocating pumping unit, a polished rod at the upper end of a rod string and a downhole pump connected to the lower end of the rod string, the method comprising the steps of:

clamping a load transducer to opposite longitudinal sides of said polished rod to apply a transverse compressive force on said polished rod by said load transducer at a single point along the length of said rod for sensing changes in diameter of said polished rod and generating a load signal corresponding to changes in said compressive force on said polished rod, digitizing said load signal to produce a first digital data set, measuring the acceleration of said polished rod by an accelerometer and generating an acceleration signal corresponding to the acceleration of said polished rod, digitizing said acceleration signal to produce a second digital data set, storing said first and second digital data sets, and processing said first and second digital data sets in conjunction with physical data for said rod string to produce a downhole pump card representing the load on said downhole pump.

31. A method for analyzing the performance of an oil well pumping system as set forth in claim 30 including a step of displaying said downhole pump card on a screen.

32. A method for analyzing the performance of an oil well pumping system as set forth in claim 30 wherein said step of clamping a load transducer comprises clamping said load transducer to said polished rod having one of a plurality of diameters.

33. A method for analyzing the performance of an oil well pumping system as set forth in claim 30 further including a step of compensating said load signal for temperature changes of said transducer.

* * * * *